(12) United States Patent
Tonai et al.

(10) Patent No.: US 7,036,998 B2
(45) Date of Patent: May 2, 2006

(54) OPTICAL PART, OPTICAL MODULE SLEEVE, OPTICAL RECEIVING MODULE, OPTICAL COMMUNICATION MODULE, AND METHOD OF MAKING OPTICAL PART

(75) Inventors: Ichiro Tonai, Yokohama (JP); Shunsuke Sato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 617 days.

(21) Appl. No.: 10/147,358

(22) Filed: May 17, 2002

(65) Prior Publication Data

US 2003/0091304 A1 May 15, 2003

Related U.S. Application Data

(60) Provisional application No. 60/295,015, filed on Jun. 4, 2001.

(30) Foreign Application Priority Data

May 17, 2001 (JP) ............................ P2001-148245

(51) Int. Cl.
G02B 6/36 (2006.01)
(52) U.S. Cl. .......................................... 385/88; 385/92
(58) Field of Classification Search ................. 385/88, 385/33, 92, 93, 94
See application file for complete search history.

(56) References Cited

U.S. PATENT DOCUMENTS 5,388,171 A * 2/1995 Michikoshi et al. .......... 385/36
5,586,208 A * 12/1996 Nishiyama ................... 385/93
5,737,465 A 4/1998 Okochi
6,278,118 B1 * 8/2001 Homme et al. ........ 250/370.11
6,540,412 B1 * 4/2003 Yonemura et al. ............ 385/88
6,793,406 B1 * 9/2004 Edwards et al. .............. 385/88

FOREIGN PATENT DOCUMENTS

| EP | 0 826 998 A2 | 3/1998 |
| JP | 58-134489 | 8/1983 |
| JP | 5-20013 | 3/1993 |
| JP | 5-196843 | 8/1993 |
| JP | 9-211267 | 8/1997 |
| JP | 9-230179 | 9/1997 |
| JP | 10-274728 | 10/1998 |

\* cited by examiner

Primary Examiner—Daniel Stcyr
(74) Attorney, Agent, or Firm—McDermott Will & Emery LLP

(57) ABSTRACT

An optical part 25, which is used to be placed at an end face of an optical fiber, is constituted by a single light-transmitting material transparent to light transmitted through the optical fiber, and comprises an optical fiber contacting face 30 disposed in contact with the end face of the optical fiber, and an light emitting face 33 tilted with respect to a cross section perpendicular to the axis of the optical fiber. Since the light emitting face 33 is formed with an inclination, such an optical part 25 restrains reflected light occurring at the optical fiber end face from going back to the optical fiber. Also, since the optical part 25 is constituted by a single light-transmitting material, its configuration is simple, and the length can be shortened in the optical axis direction.

13 Claims, 18 Drawing Sheets

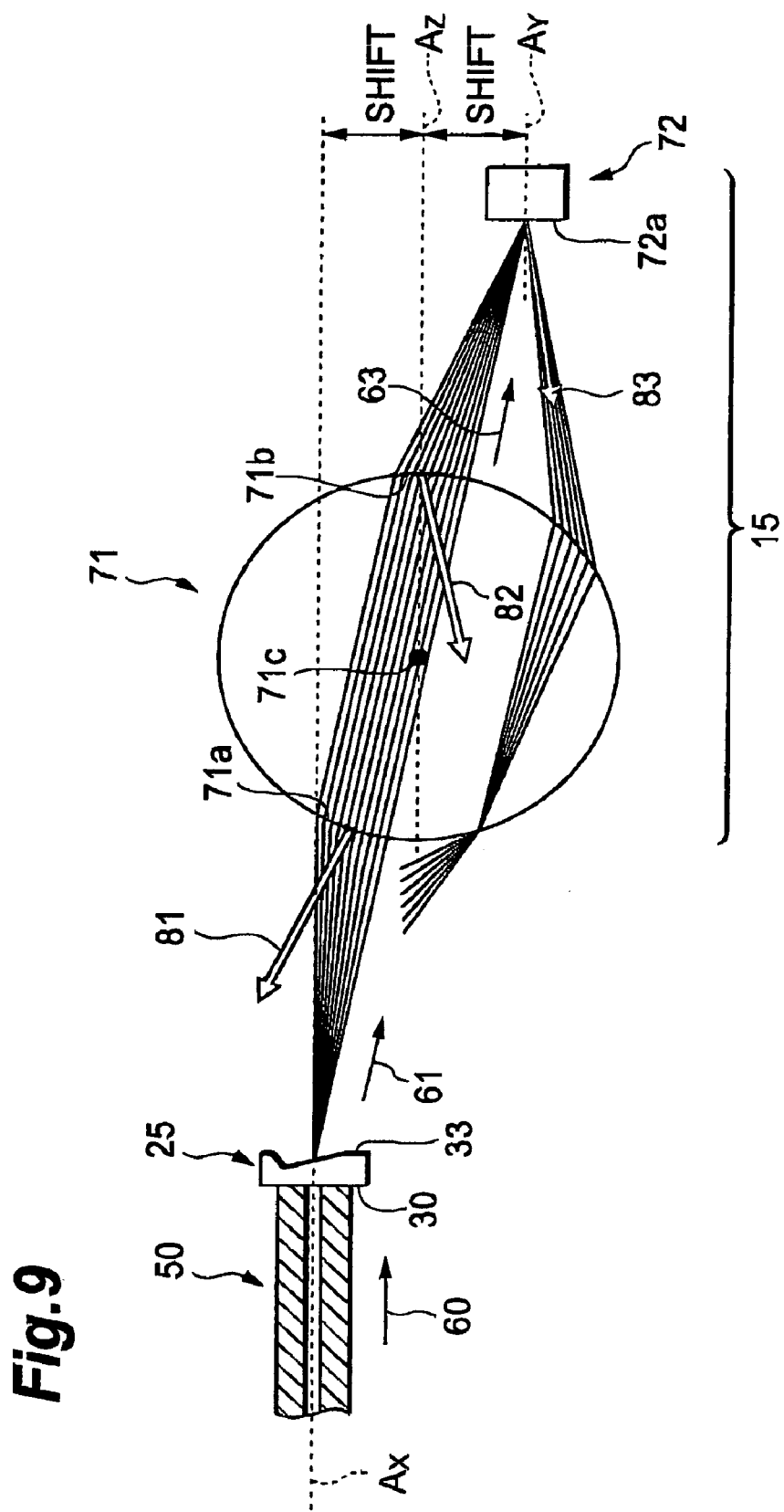

OPTICAL PART, OPTICAL MODULE SLEEVE, OPTICAL RECEIVING MODULE, OPTICAL COMMUNICATION MODULE, AND METHOD OF MAKING OPTICAL PART

CROSS-REFERENCE TO RELATED APPLICATIONS

This application claims the benefit of the claiming priority of U.S. Provisional application Ser. No. 60/295,015, filed on Jun. 4, 2001, which provisional application is incorporated by reference herein.

BACKGROUND OF THE INVENTION

1. Field of the Invention

The present invention relates to an optical communication module, an optical receiving module, a sleeve, an optical part, and a method of making the optical part.

2. Description of the Related Art

European Patent Publication No 826998-A2 discloses an optical receiving module in which a short ferrule is incorporated, whereas the short ferrule has an internal optical fiber therein. The optical receiving module is optically coupled to an output end of an optical fiber, whereas this end abuts against the input end of the internal optical fiber in the short ferrule. Light is emitted from the optical fiber, and this light is incident on the internal optical fiber contained in the short ferrule. On the other hand, the short ferrule has a tilted face at the output end thereof. When light travels across an interface between optical media having respective refractive indices different from each other, transmitted light and reflected light is created at this interface from the traveling light (e.g., the optical fiber has a refractive index of 1.46 whereas the atmosphere has a refractive index of 1.0). In the optical receiving module disclosed in the above-mentioned publication, the tilted face of the output end of the short ferrule serves to restrains the light reflected at the output end of the short ferrule from returning to the short ferrule and optical fiber.

SUMMARY

However, such a short ferrule has its length of about 3 to 4 mm at the minimum to contain the internal optical fiber therein. This length expands the size of the optical receiving module. Since the short ferrule used therein is costly, the optical receiving module tends to be expensive.

Therefore, it is an object of the present invention to provide an optical part, a receiving module sleeve, an optical receiving module, and an optical communication module which are small in size and excellent in transmission quality, and a method of making the optical part.

In one aspect, the present invention provides an optical part used in a sleeve for an optical module for optically coupling an optical device to an optical fiber. This optical part comprises a light-transmitting portion and a supporting portion. The optical part is constituted by a material transparent to light associated with the optical device. The light-transmitting portion has a pair of faces intersecting a predetermined axis extending along a predetermined plane, and is transparent to light propagating through the optical fiber. One of the pair of faces is provided so as to abut against an end of the optical fiber, whereas the other is tilted with respect to a plane orthogonal to the predetermined axis. The supporting portion is provided, adjacent to the light-transmitting portion, so as to be held with the sleeve.

In another aspect, the present invention provides a sleeve for an optical module for optically coupling an optical device to an optical fiber. The sleeve comprises first to third portions arranged along a predetermined axis. The first portion is provided so as to receive a ferrule for holding the optical fiber. The second portion is provided so as to receive an optical subassembly including the optical device.

In one configuration of the sleeve, the third portion is provided between the first and second portions and comprises a light-transmitting portion. The light-transmitting portion has a pair of faces intersecting the predetermined axis, and is transparent to light propagating through the optical fiber. One of the pair of faces is provided so as to abut against an end of the optical fiber. The other of the pair of faces is tilted with respect to a plane orthogonal to the predetermined axis. The sleeve is made from material transparent to light associated with the optical device.

In another configuration of the sleeve, the third portion is provided between the first and second portions and holds the optical part.

In still another configuration of the sleeve, the third portion is provided between the first and second portions and holds the optical part comprising a reference surface. The third portion has at least one inner side face extending along the predetermined axis. The reference surface is separated from one inner side face of the third portion so as to form a gap between the inner side face and the reference surface.

In still another aspect, the present invention provides an optical receiving module. The optical receiving module comprises a sleeve and an optical subassembly.

In one configuration of the optical receiving module, the sleeve comprises an optical part. The optical subassembly is attached to the second portion of the sleeve and is optically coupled with the optical part. The optical subassembly comprises an optical device and an optical lens, and the optical lens is optically coupled with the optical device. The optical device includes a semiconductor light-receiving element. In the optical receiving module, the optical part is useful for reducing the reflection of light from the optical fiber. Since the optical part is installed in the sleeve, positioning the optical part to the sleeve is not needed.

In another configuration of the optical receiving module, the optical subassembly is attached to the second portion of the sleeve so as to be optically coupled with the other of the pair of faces of the third portion of the sleeve. The optical subassembly comprises an optical device and an optical lens, and the optical lens is optically coupled with the optical device. The optical device includes a semiconductor light-receiving element. The sleeve does not comprise the optical part, whereas the light-transmitting portion is integrally formed with the sleeve. Therefore, positioning the optical part to the sleeve is unnecessary. The longitudinal length of the optical communication module is reduced. In the optical receiving module, the other of the pair of faces of the third portion in the sleeve is used for reducing the reflection of light from the optical fiber.

In still another aspect, the present invention provides an optical communication module. The optical communication module comprises a housing, an optical receiving module, and an optical transmitting module. The housing comprises first and second receptacles. The first receptacle is provided so as to accommodate one end of an optical fiber through which receiving light propagates. The second receptacle is provided so as to accommodate one end of an optical fiber through which transmitting light propagates. The optical receiving module is provided in the housing so as to receive the receiving light. The transmitting module is located in the housing so as to provide transmitting light.

In still another aspect, the present invention provides a method of making an optical part. This method comprises the steps: (a) preparing a forming die for defining shapes of a light-transmitting portion, a supporting portion, a protrusion, and a reference surface of an optical part; (b) preparing a material tablet having a volume smaller than the maximum volume defined by the forming die for the light-transmitting portion, supporting portion, and protrusion of the optical part; (c) molding the material tablet by using the forming die; and (d) taking out the molded optical part from the forming die. In this method, the material tablet may include a glass material.

An optical part in accordance with the present invention is used in contact with an end face of an optical fiber, the optical part being constituted by a single light-transmitting material transparent to light transmitted through the optical fiber, and the optical part comprising an optical fiber contacting face provided in contact with one end of the optical fiber to cover the end as a whole; and an light emitting face tilted with respect to a plane perpendicular to the axis of the optical fiber and opposed to the optical fiber contacting face.

A sleeve for an optical receiving module in accordance with the present invention comprises a ferrule engaging portion for engaging a ferrule disposed at an end of an optical fiber; any of the above-mentioned optical parts provided adjacent to the ferrule engaging portion and adapted to abut against one face of the optical fiber when the optical fiber engages the ferrule engaging portion; and a photoelectric transducer attaching portion for attaching a photoelectric transducer thereto, the optical part being disposed between the ferrule engaging portion and the photoelectric transducer attaching portion.

A sleeve for an optical receiving module in accordance with the present invention is formed from a single light-transmitting material. The sleeve comprises a ferrule engaging portion for engaging a ferrule provided at one end of an optical fiber; an optical fiber contacting face provided adjacent to the ferrule engaging portion and adapted to abut against the end of the optical fiber when the optical fiber engages the ferrule engaging portion; an light emitting face, provided to tilt with respect to a cross section of the optical fiber perpendicular to the axis thereof, for emitting light incident from the optical fiber contacting face; and a photoelectric transducer attaching portion for attaching a photoelectric transducer thereto, the optical fiber contacting face and light emitting face being arranged between the ferrule engaging portion and the photoelectric transducer attaching portion.

An optical receiving module in accordance with the present invention comprises any of the above-mentioned receiving module sleeves, and a photoelectric transducer attached to the photoelectric transducer attaching portion of the sleeve. The photoelectric transducer comprises an optical lens provided so as to face a light-receiving face of the photoelectric transducer.

An optical communication module in accordance with the present invention comprises a first receptacle for accommodating one end of a receiving optical fiber; the above optical receiving module, provided adjacent to the first receptacle, for converting an optical signal emitted from an end of the optical receiving optical fiber into an electric signal; a second receptacle for accommodating one end of a transmitting optical fiber; and an optical transmitting module, provided adjacent to the second receptacle, for converting an electric signal into an optical signal and then emitting thus obtained optical signal to the end of the transmitting optical fiber.

The above-mentioned objects and other objects, features, and advantages of the present invention will be understood more easily from the following detailed descriptions of preferred embodiments of the present invention set forth with reference to the accompanying drawings.

BRIEF DESCRIPTION OF THE DRAWINGS

FIG. 1A is an overall view of an optical communication module mounted with the optical receiving module in accordance with one embodiment, whereas

FIG. 2A is a view of an optical transmitter including the transmitting module in accordance with the above-mentioned embodiment, whereas

FIG. 3A is a view of an optical receiver including the optical receiving module in accordance with the above-mentioned embodiment, whereas

FIG. 4A is a perspective whole view showing the sleeve shown in FIGS. 3A and 3B, whereas

FIG. 9 is a view showing optical coupling in the optical receiving module in accordance with the embodiment;

FIG. 15A is a sectional view taken along the line VI—VI of FIG. 14, whereas

DETAILED DESCRIPTION OF THE PREFERRED EMBODIMENT

Figure 1A:
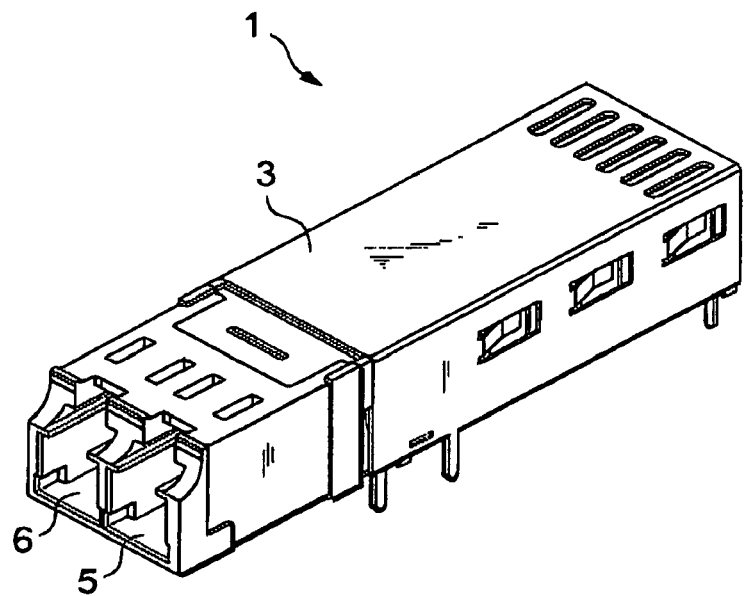

Embodiments of the present invention will be explained with reference to the drawings. When possible, identical or similar parts will be referred to with the same reference numerals.

In the following, optical communication modules, optical receiving modules, sleeves, and optical parts in accordance with embodiments of the present invention will be described with reference to the drawings. An optical communication module receives signal light and generates an electric signal corresponding to the received light, and the optical communication module receives an electric signal and generates signal light corresponding to this electric signal. An optical receiving module receives an optical signal and converts it into an electric signal. A sleeve comprises an optical fiber for transmitting an optical signal therethrough and a light-receiving element acting as a photoelectric transducer. The sleeve is preferably used for an optical receiving module. An optical part is attached to a sleeve, whereas an end of an optical fiber abuts against the optical part.

Subsequently, optical parts, optical receiving modules sleeves, optical receiving modules, and optical communication modules will now be explained.

First Embodiment

Figure 1B:
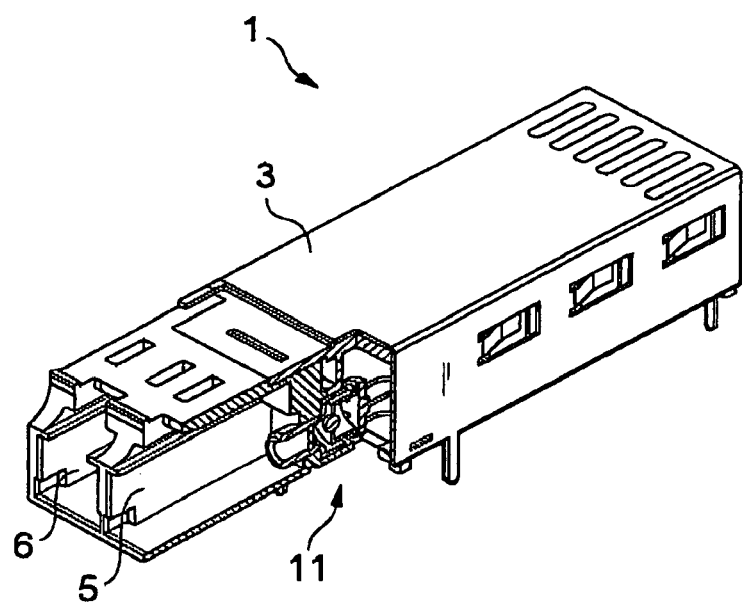
FIG. 1B is a partly cutaway view of the optical communication module shown in FIG. 1A.

FIG. 1A is a perspective view showing an optical communication module mounted with the optical receiving module in accordance with one embodiment. FIG. 1B is a partly cutaway view of the optical communication module shown in FIG. 1A. This optical communication module (transceiver) 1 is an apparatus for converting electric signals into optical signals and vice versa.

The optical communication module 1 comprises an optical receiver 11 for receiving optical signals and converting them into electric signals, and a transmitter for converting electric signals into optical signals and transmitting thus generated optical signals. The optical transmitter is connected to a first receptacle 6 for accommodating a transmitting optical connector, whereas the optical receiver 11 is connected to a second receptacle 5 for accommodating a receiving optical connector. FIG. 1B shows the arrangement of the receiver 11 and second receptacle 5, whereas the optical transmitter and first receptacle 6 are arranged as well. The optical connector is a device capable of connecting a pair of optical fibers with the optical communication module 1, whereas each of the optical fibers is held with a ferrule. In this embodiment, an optical communication module will be explained. In the optical communication module 1, a ferrule is secured to an end of an optical fiber, and the optical receiver 11 and the optical transmitter are contained in a housing 3.

Figure 2A:
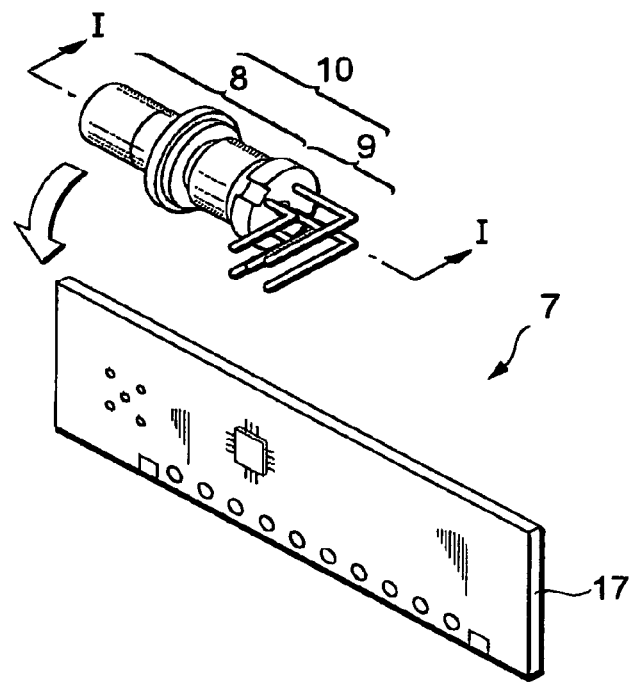
Figure 2B:
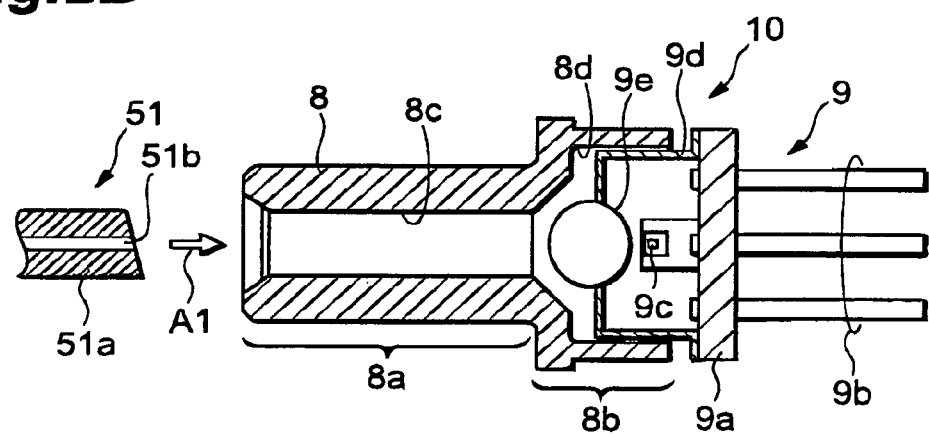
FIG. 2B is a sectional view showing an optical transmitting subassembly for the transmitting module in accordance with the above-mentioned embodiment.

FIG. 2A is a perspective view showing the optical transmitter in accordance with this embodiment. FIG. 2B is a sectional view showing the optical transmitting module taken along the line I—I shown in FIG. 2A. The optical transmitter 7 is included in the optical communication module 1 shown in FIGS. 1A and 1B. The optical transmitter 7 comprises a sleeve 8, a light-emitting subassembly 9, and is a wiring board 17. The optical transmitting module 10 is constructed from an assembly of the sleeve 8 and light-emitting subassembly 9. The light-emitting subassembly 9 is positioned with respect to the sleeve 8 such that light from a light-emitting device is incident on an end of the optical fiber.

The light-emitting subassembly 9 comprises a mounting member 9a, a plurality of lead terminals 9b, a semiconductor light-emitting device 9c, a lens holding member 9d, and a lens 9e. An example of the mounting member 9a is a stem. The lead terminals 9b are arranged in the mounting member 9a and extend in a predetermined axial direction so as to penetrate through the mounting member 9a. The semiconductor light-emitting device 9c is located on the mounting member 9a, and is a semiconductor laser element, for example. The lens holding member 9d is located on the mounting member 9a so as to cover the semiconductor light-emitting device 9c. The lens holding member 9d holds the lens 9e. By way of the lens 9e, the semiconductor light-emitting device 9c is optically coupled to an optical fiber inserted into the sleeve 8. The semiconductor light-emitting device 9c receives driving signals by way of the lead terminals 9b.

Referring to FIGS. 2A and 2B, the lead terminals 9b of the light-emitting subassembly 9 are assembled with the wiring board 17 to form the optical transmitting module 7 comprising the light-emitting subassembly 9 and wiring board 17.

The sleeve 8 has a first portion 8a and a second portion 8b which are arranged along a predetermined axis. The first portion 8a of the sleeve 8 comprises an inner side face 8c for guiding a ferrule 51a of an optical connector 51 inserted in the direction of Arrow A1. The ferrule 51a holds an optical fiber 51b. The second portion 8b comprises an inner side face 8d for guiding the light-emitting subassembly 9. The light-emitting subassembly 9 is attached to the sleeve 8 such that the outer side face of the lens holding member 9d in the light-emitting subassembly 9 is faced with the inner side face 8d of the sleeve 8.

Figure 3A:
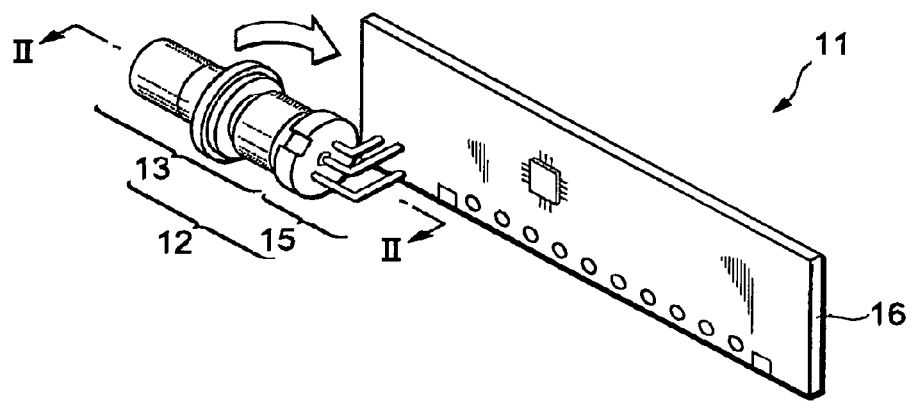

FIG. 3A is a perspective view showing the optical receiver in accordance with this embodiment. The optical receiver 11 comprises a receiving module sleeve 13 (hereinafter referred to as sleeve 13), a photoelectric transducer (light-receiving subassembly) 15, and a wiring board 16. An optical receiving module 12 is constituted from an assembly of the sleeve 13 and photoelectric transducer 15. The photoelectric transducer 15 is positioned with respect to the sleeve 13 such that light from an end of an optical fiber is incident on a light-receiving element within the photoelectric transducer 15.

Figure 3B:
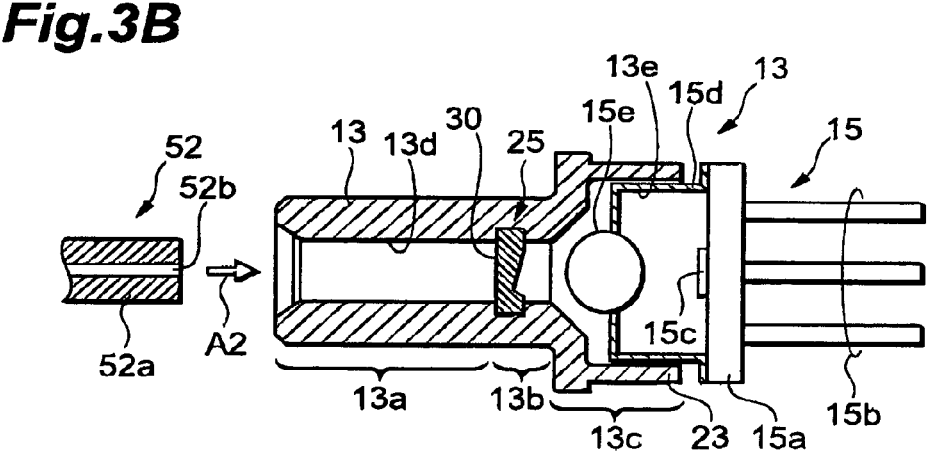
FIG. 3B is a sectional view showing an optical receiving subassembly for the optical receiving module in accordance with the above-mentioned embodiment.

As shown in FIG. 3B, a ferrule of an optical connector accommodated in the second receptacle 5 is attached to the sleeve 13 to establish optical connection. The photoelectric transducer 15 is constituted by a light-receiving element, and an optical lens provided so as to be faced with a light-receiving face of the light-receiving element. The optical lens condenses light from the end of the optical fiber, and the light-receiving element receives thus condensed light and converts the received light into an electric signal. The photoelectric transducer 15 is connected to the wiring board 16, whereas the converted electric signal is amplified to convert the amplified signal into binary form on the wiring board 16. Here, the optical lens is disposed such that its geometric center of gravity is displaced from an extension of the center axis of the optical fiber. This will be explained later in detail. The light-receiving element and optical lens, which are constituents of the photoelectric transducer 15, may be separate members. For example, the optical lens may be secured to the sleeve 13.

FIG. 3A is a perspective view showing the optical receiver in accordance with this embodiment. FIG. 3B is a sectional view showing the optical receiving module taken along the line II—II shown in FIG. 3A. The optical communication module 1 as shown in FIGS. 1A and 1B includes the optical receiver 11, The optical receiver 11 comprises the sleeve 13, optical receiving subassembly 15, and wiring board 16. The optical receiving module 11 is constituted by an assembly of the sleeve 13 and optical receiving subassembly 15. The light-receiving subassembly 15 is positioned with respect to the sleeve 13 such that light from the the optical fiber is incident on the light-receiving device.

The light-receiving subassembly 15 comprises a mounting member 15a, a plurality of lead terminals 15b, a semiconductor light-receiving device 15c, a lens holding member 15d, and a lens 15e. An example of the mounting member 15a is a stem. The lead terminals 15b are arranged in the mounting member 15a and extend in a predetermined axial direction to penetrate through the mounting member 15a. The semiconductor light-receiving element 15c is provided on the mounting member 15a, and is a photodiode, for example. The lens holding member 15d is located on the mounting member 15a so as to cover the semiconductor light-receiving device 15c. The lens 15e is held with the lens holding member 15d. By way of the lens 15e, the semiconductor light-receiving device 15c is optically coupled with an optical fiber inserted into the sleeve 13. By way of the lead terminals 15b, the semiconductor light-receiving element 15c provides a photoelectric current.

Referring to FIGS. 3A and 3B, the lead terminals 15b of the light-receiving subassembly 15 are assembled with the wiring board 16 to form the light-receiving module 11 comprising the light-receiving subassembly 15 and wiring board 16.

The sleeve 13 comprises a first portion 13a, a second portion 13b, a third portion 13c, and an optical part 25. The first to third portions 33a to 13c are arranged along a predetermined axis. The first portion 13a of the sleeve 13 comprises an inner side face 13d for guiding a ferrule 52a of an optical connector 52 inserted in the direction of Arrow A2. The ferrule 52a holds an optical fiber 52b. The second portion 13b holds the optical part 25. The third portion 13c comprises an inner side face 13e for guiding the light-receiving subassembly 15. The light-receiving subassembly 15 is attached to the sleeve 13 such that the outer side face of the lens holding member 15d in the light-receiving subassembly 15 is faced with the inner side face 13e of the sleeve 13.

The ferrule 52a of the optical connector 52 is inserted into the sleeve 13 while being guided by the inner side face 13d, and abuts against one face 30 of the optical part 25. This abutting determines the position of the optical fiber 52b. Light from the optical fiber 52b passes through the optical part 25, and is incident on the semiconductor light-receiving element 15c by way of the lens 15e. This abutting also reduces the light reflection at an end face of an optical fiber 52b.

Figure 4A:
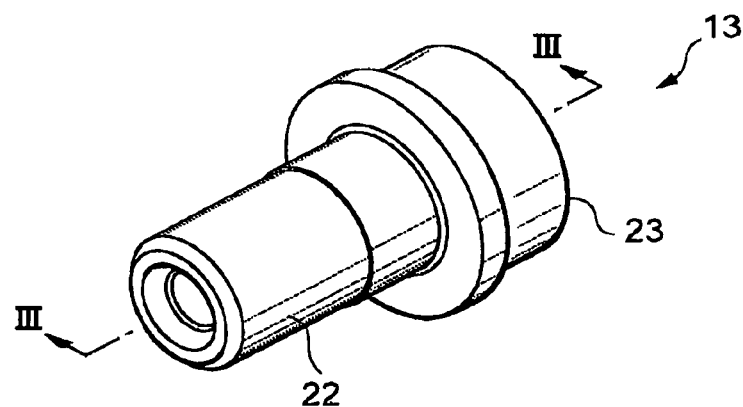
Figure 4B:
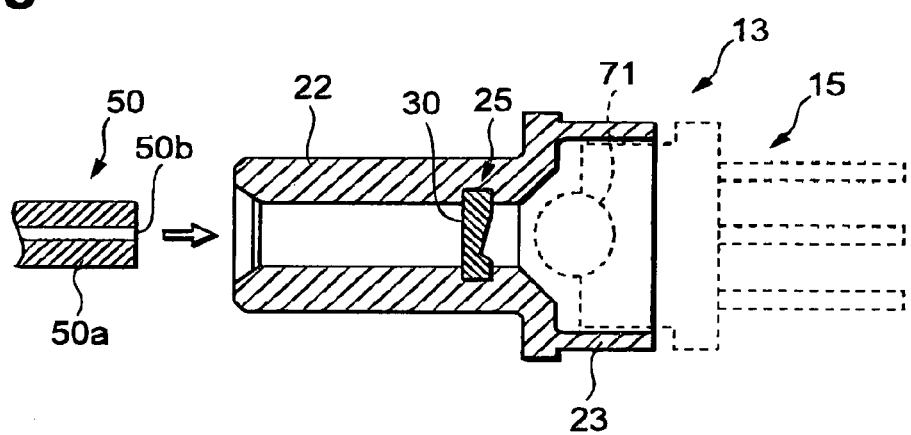
FIG. 4B is a sectional view of the sleeve shown in FIG. 4A.

FIG. 4A is a perspective view showing the sleeve shown in FIG. 3A. FIG. 4B is a sectional view of the sleeve taken along the line III–III shown in FIG. 4A. One end of the sleeve 13 is provided with a ferrule engaging portion 22 capable of engaging a ferrule 50a therewith provided at one end of the optical fiber 50. The other end portion of the sleeve 13 is provided with a photoelectric transducer attaching portion 23 for attaching the photoelectric transducer 15 thereto. The sleeve 13 connects the optical fiber 50 to the photoelectric transducer 15. The sleeve 13 further comprises the optical part 25 disposed adjacent to the ferrule engaging part 22. As shown in FIG. 4B, the optical part 25 is placed such that the end face 50b of the optical fiber 50 comes into close contact with (abuts against) its placing face 50 when the optical fiber 50 fits into the ferrule engaging part 22. The broken lines shown in FIG. 4B indicate the photoelectric transducer 15 (including an optical lens 71) attached thereto.

Figure 5A:
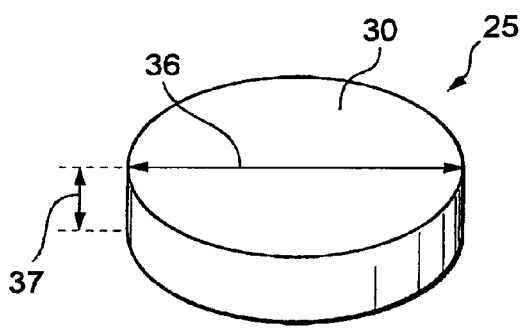
FIGS. 5A and 5B are perspective views each showing the optical part.
Figure 5C:
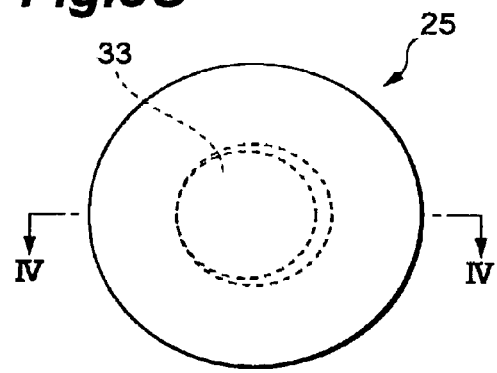
FIG. 5C is a plan view showing the optical part.
Figure 5B:
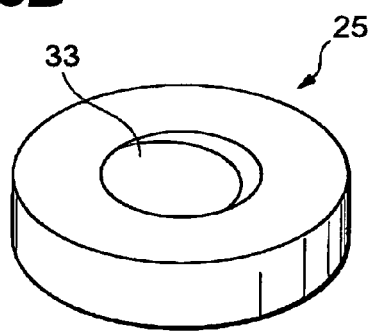
Figure 5D:
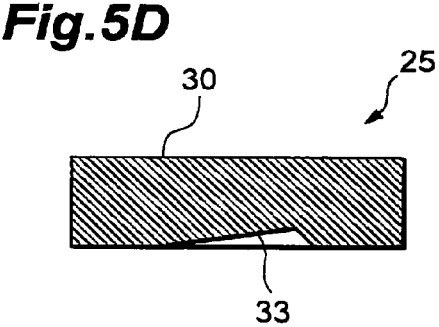
FIG. 5D is a sectional view showing the optical part.

FIGS. 5A and 5B are perspective views showing the optical part. FIG. 5C is a plan view showing the optical part. FIG. 5D is a sectional view showing the optical part taken along the line IV—IV shown in FIG. 5C. The optical part 25 is constituted by a single light-transmitting material transparent to light transmitted through the optical fiber 50. The optical part 25 has a cylindrical form with a diameter 36 of 1.7 mm and a thickness of 0.5 mm, for example. As the light-transmitting material, optical glass (PBK-40; Sumita Optical Glass, Inc.) is used, for example. This optical glass material makes the optical part 25 scratch-proof and allows the easy manufacturing of the optical part 25. In particular, this optical glass material reduces a thickness 37 of the optical part 25. Using this optical part can make the sleeve 13 shorter than a sleeve comprising a short ferrule with a length of about 3 mm in a direction of the optical axis of the optical fiber 50, and this optical part allows the reduction in size of the sleeve 13, optical receiving module 12, and optical communication module 1. Also, the light-transmitting material has a refractive index closer to that of the optical fiber 50 (having a refractive index of 1.46). This can restrain the reflection of light at the interface between the optical fiber 50 and the optical part 25 (see the following expression (1)).

One side of the optical part 25 is provided with the optical fiber contacting face 30. The end face 50b of the optical fiber 50 comes into close contact with the optical fiber contacting face 30. The optical fiber contacting face 30 abuts against the end 50b of the optical fiber 50 so as to cover the whole face of the end 50b.

In the optical receiving module using a short ferrule disclosed in European Patent Publication No. 826998-A2, the input end of an internal optical fiber within the short ferrule abuts against the output end of an optical fiber and comes into contact therewith. That is, since one optical fiber abuts against the other optical fiber, axial misalignment is likely to occur between the two optical fibers. The axial misalignment generates reflected return light at the output end of the optical fiber. However, the optical part 25 eliminates such inconveniences of the axial misalignment because the whole end face 50b of the optical fiber is covered with the optical part 25. These advantages are obtained because the optical part 25 is formed from a single light-transmitting material.

The optical fiber contacting face 30 is formed into a convex surface, and the convex surface may be smooth as a mirror. Pressing the convex surface against the end 50b of the optical fiber 50 slightly deforms the end 50b and the optical fiber contacting face 30, thereby achieving Physical Contact (PC). That is, the Physical Contact avoids the formation of gaps between the end face 50b of the optical fiber 50 and the optical fiber contacting face 30, and can prevents the reflection of light at the interface (end face 50b). Also, this structure makes it easier to optically couple the optical part 25 to an optical fiber attached to the sleeve, and yields the optical part 25 exhibiting an improved optical coupling efficiency with respect to the optical fiber. Thus, the optical part is also advantageous in that it has a structure excellent in mass-productivity.

The other face of the optical part is formed with a light emitting face 33 tilted by an angle of at least five degrees but not greater than eight degrees with respect to a cross section perpendicular to the optical axis direction of the optical fiber 50 This exit end face 33 is also smooth as a mirror. When light proceeds between media different from each other, reflected light occurs at their interface, refractivity of which is expresses by the ratio of:

$$R=(n1-n2)^2/(n1+n2)^2 \qquad (1)$$

where n1 is the refractive index of medium 1, and n2 is the refractive index of medium 2 In the optical part 25 in accordance with this embodiment, the tilted exit end face 33 prevents the reflected light at the light emitting face 33 from returning to the end face 50b. The tilted surface can restrain the reflected light from returning back through the optical fiber 50 to the optical transmitter provided at the other end of the optical transmission line. This prevents the operation of the optical transmitter from being adversely affected, and avoids the deterioration of the transmission quality. In order to increase the quantity of light incident on the light-receiving element, the light emitting face 33 (and the optical fiber contacting face 30) may be provided with an antireflection film.

Figure 6A:
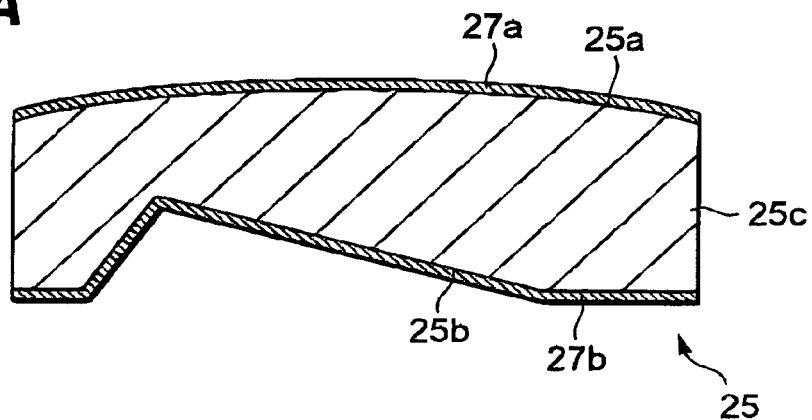
FIGS. 6A to 6C are views showing coatings for the optical part.

As shown in FIG. 6A, the optical part 25 made of the optical glass material bay comprise moisture-resistant coating films 27a and 27b thereon made of material, such as a silicon oxide or titanium oxide (in the region through which light is transmitted in particular). These coating films can suppress white tarnishing caused by moisture in an atmosphere and the like. Referring to FIG. 6A, the optical part 25 comprises a glass body 25c having a pair of faces 25a and 25b, the moisture-resistant coating film 27a provided on the face 25a, and the moisture-resistant coating film 27b provided on the face 25b.

Figure 6B:
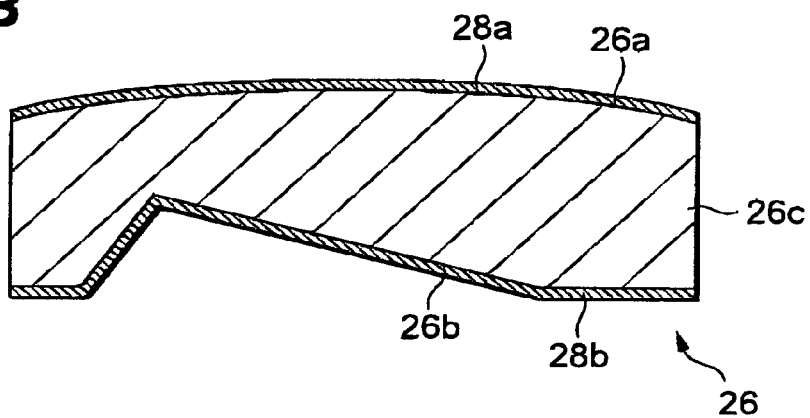

The light-transtitting material is listed in addition to optical glass as follows: light-transmitting resin materials such as Ultem, Arton FX4726 or FX4727, and Zeonex (registered trademark). As shown in FIG. 6B, the optical part 26 comprises reinforcement thin films 28a, 28b, transparent to the light, made of silicon oxide films and the like, on the surfaces of a light-transmitting resin article, whereby its surface hardness is enhances. Referring to FIG. 6B, the optical part 26 comprises a resin body 26c having a pair of faces 26a and 26b, the reinforcement thin film 28a provided on the face 26a, and the reinforcement thin film 28b provided on the face 26b.

Figure 6C:
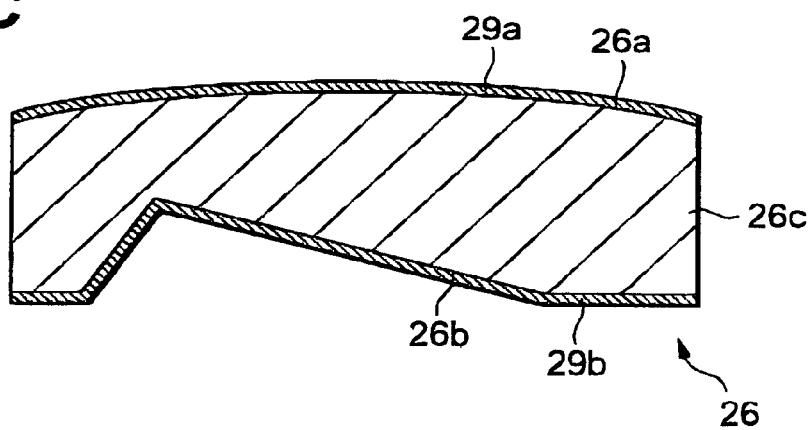

As shown in FIG. 6C, moisture-resistant protective films 29a and 29b, transparent to the light, is made of silicon oxide films and the like, and may further be provided on the surfaces of the light-transmitting resin. The films protect the light-transmitting resin article against moisture in an atmosphere and the like. Referring to FIG. 6C, the optical part 26 comprises a resin body 26c having a pair of faces 26a and 26b, the moisture-resistant protective film 29a provided on the face 26a, and the moisture-resistant protective film 29b provided on the face 26b.

Since the optical part 25 is constituted by optical glass or a molding resin, it is free from inconveniences, such as the breaking of films which may occur due to deformations of the films upon pressing with the optical fiber.

Figure 7A:
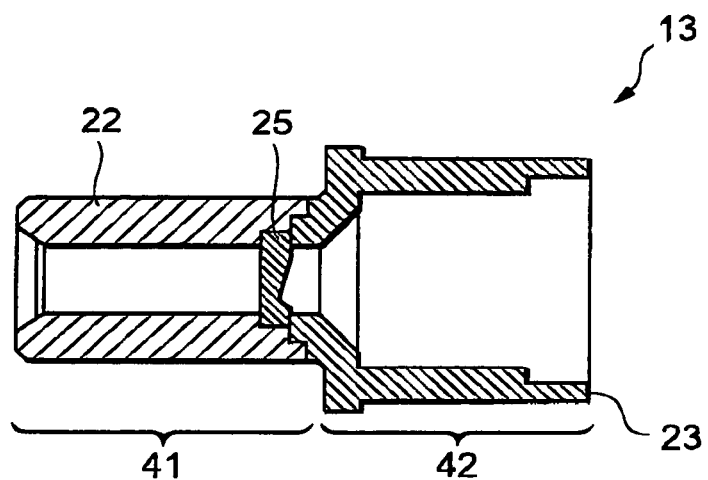
FIGS. 7A to 7C are views for explaining methods of making sleeves.
Figure 7B:
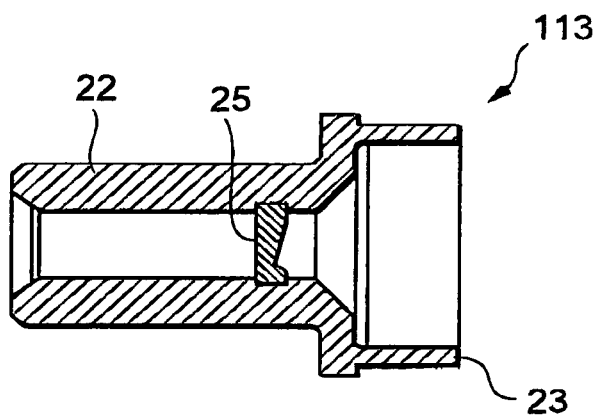
Figure 7C:
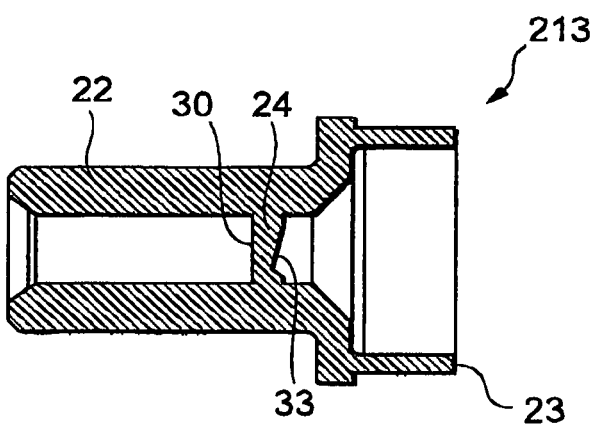

FIGS. 7A to 7C are views showing structures of sleeves and methods of making the same. As shown in FIG. 7A, the optical part 25 may be attached into the sleeve 13 by assembling a plurality of parts. Namely, a first part 41 including the ferrule engaging portion 22 and a second part including the photoelectric transducer attachment 23 are separately prepared. Subsequently, the optical part 25 may be secured at a predetermined position of the first portion 41, and then the two parts 41 and 42 are assembled together to yield the sleeve 13. Since the optical part 25 is secured to the first part 41, the optical part 25 can be attached to and positioned in the sleeve 13 accurately. The arrangement of the sleeve 13 and optical part 25 can attain Physical Contact (PC) between the end 50b of the optical fiber 50 and the optical part 25.

In this configuration, one of the first part 41 and second part 42 has a recess for receiving the optical part 25. This recess defines the position of the optical part 25 with respect to the sleeve. The optical part 25 is located in the recess and is held between the first part 41 and the second part 42.

As shown in FIG. 7B, the sleeve may also be formed by insert-molding. Due to insert-molding of a sleeve 113, the optical part 25 is attached into the sleeve 113 and is positioned with respect to the sleeve 113.

As shown in FIG. 7C, a sleeve 213 having an optical part portion and a sleeve body portion may be integrally formed by using the same light-transmitting material as that of the optical part 25. This sleeve 213 requires no step of assembling the optical part 25 and sleeve together. The sleeve 213 has a ferrule engaging portion 22, an optical part portion 24, and a photoelectric transducer attachment 23, which are arranged in a direction of a predetermined axis. The optical part portion 24 is positioned between the ferrule engaging portion 22 and the photoelectric transducer attachment 23. The optical part 24 has a pair of faces 30 and 33 intersecting the predetermined axis.

Figure 8A:
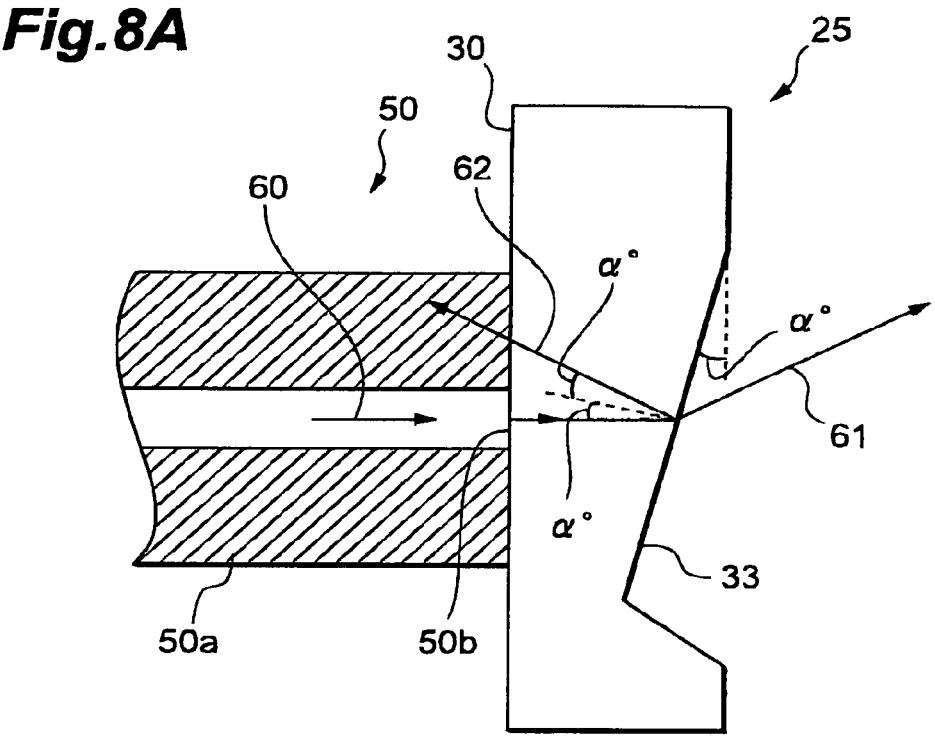
FIGS. 8A and 8B are views showing respective optical coupling in optical parts in accordance with the embodiment.
Figure 8B:
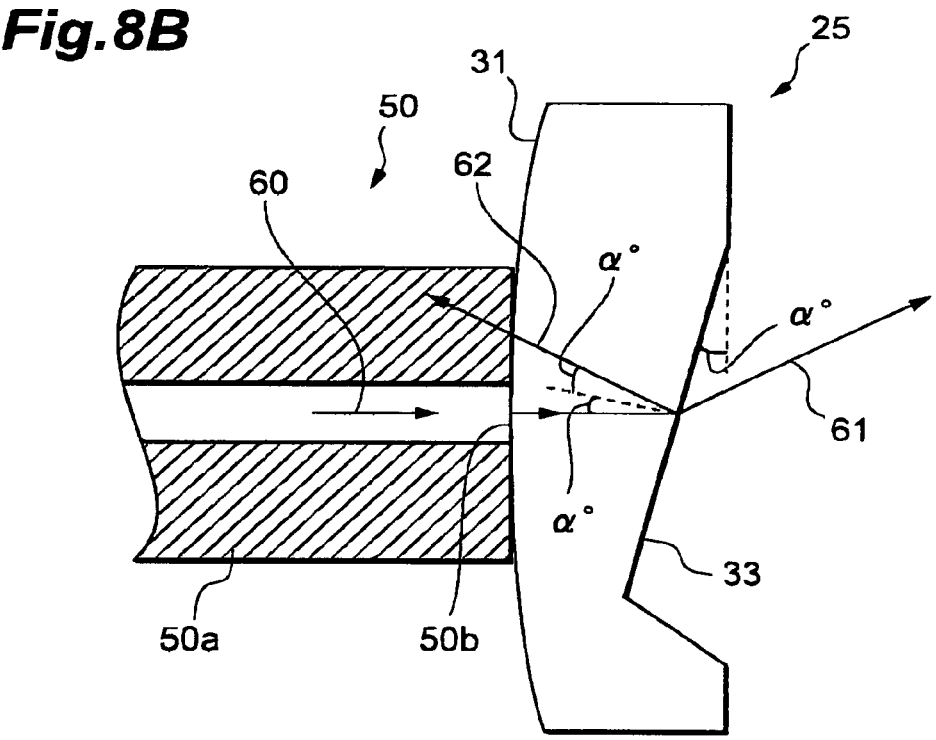

FIGS. 8A and 8B are views showing arrangements of the optical part and optical fiber in this embodiment. Light from the optical fiber 50 advances into the optical part 25 disposed in close contact with the end 50b of the optical fiber 50, and then outgoing light 61 is emitted from the light emitting face 33 of the optical part 25. Reflected return light 62, represented by expression (1), occurred at the light emitting face 33. Since the light emitting face 33 is formed into a tilted surface (with an angle of inclination of $\alpha$ degrees), the reflected light 62 advances in the direction shifted by $2\alpha$ degrees from the optical axis and does not advance in the backward direction along the optical axis of the optical fiber. As a result, the reflected light 62 is prevented from going back to the optical fiber 50.

According to results of experiments conducted by the inventors, the intensity of reflected return light incident on the end face 50b of the optical fiber 50 is −14 to −15 dB when the optical part 25 is not used, but the intensity of reflected return light can be suppressed to −33 dB when the optical part 25 is used. This value is not greater than the standard value of −27 dB (in compliance with SDR: ITU-T G.957 or SONET: GR-253-CORE).

The optical part 25 may comprise a convex surface 31 projecting from a plane orthogonal to the optical axis of the optical fiber. This curved surface enables an end face of an optical fiber to come into physical contact with the optical part. The optical part 25 may be attached to the sleeve body in a position displaced from an appropriate position on a plane perpendicular to the direction in which the optical fiber extends. If the optical part 25 comprises the convex surface 31, any part of the convex surface 31 comes into contact with the end face of the optical fiber. Without the convex surface, a gap will be formed between the end of the optical fiber and the surface of the optical part 25. This gap will cause the reflection of light at the end of the optical fiber and the surface 31 of the optical part 25. The convex surface preferably has a radius of curvature R of at least 20 mm. Due to this radius of curvature R, the curved surface does not operate to condense light from the optical fiber onto the light-receiving element in the optical receiving module in this embodiment.

FIG. 9 is a view showing optical coupling relationship in the receiving module in accordance with this embodiment. The light 60 propagating through the optical fiber 50 is refracted by the tilted light emitting face 33 of the optical part 25 to form outgoing light 61 advancing in a direction deviating from the optical axis direction of the light 60. The outgoing light 61, which is divergent light, is condensed by the optical lens 71 and then is received by a light-receiving element 72. The geometric center of gravity 71c of the optical lens 71 is located at a position displaced from the optical fiber center axis Ax (the advancing direction in which light 60 advances). Although reflected return light beams 81, 82, 83 occur at the entrance face 71a and light emitting face 71b of the optical lens 71 and at the light-receiving face 72a of the light-receiving element 72 in accordance with this embodiment, these reflected return light beams does not go back to the end face 50b of the optical fiber 50 because of the deviation of the optical lens 71 from the optical fiber center axis Ax in the receiving module 12. The light-receiving element 72 is positioned on an axis $A_Y$ located at a position displaced from the optical fiber center axis $A_X$ (the advancing direction of light 60). The geometric center 71c of gravity of the optical lens 71 is positioned on an axis Az. The axis $A_Y$ is shifted from the optical fiber center axis $A_X$. The axis $A_Z$ is shifted from the optical fiber center axis $A_X$.

Experiments conducted by the inventors have revealed the following results concerning the intensity of reflected light beams 81 to 83 incident on the end 50b of the optical fiber 50. Assuming that the light 60 has a wavelength in the band of 1.3 micrometers (μm), whereas the entrance face 71a and light emitting face 71b of the optical lens 71 and the light-receiving face 72a of the light-receiving element 72 are provided with antireflection films for the wavelength band of 1.3 micrometers (μm), the intensity of each of the reflected light beams 81 to 83 has been proved to be suppressed to −70 dB or less, which is much lower than the standard value (mentioned above). When the light 60 has a wavelength in the band of 1.55 micrometers (μm) in the design as mentioned above, the intensity of each of the reflected light beams 81 to 83 has been proved to be suppressed to −50 dB or less, which is much lower than the standard value (mentioned above).

Figure 10A:
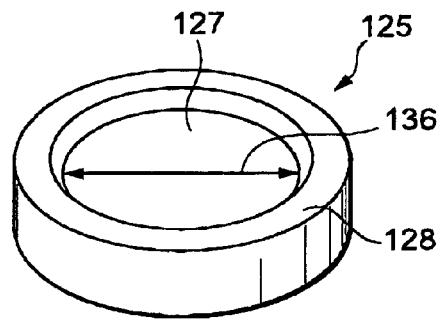
FIGS. 10A to 10E are respective views of optical parts in accordance with other configurations.
Figure 10B:
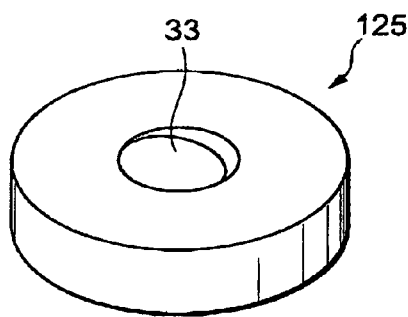

FIGS. 10A to 10E are perspective views showing optical parts in accordance with modifications. FIGS. 10A to 10E illustrate various modes of optical parts. For example, as shown in FIG. 10A, an optical part 125 may comprise an closed projection 128, surrounding optical fiber contacting face 127, protruded from the surface of the optical fiber contacting face 127. In this example, the optical fiber contacting face 127 is provided to form a convex surface. In the optical part 125, the damage of the placing face 127 is avoided upon handling. The minimum value of its inner diameter 136 is greater than the outer diameter of the ferrule 50a. FIG. 10B is a perspective view showing the opposite face of the optical part 125 shown in FIG. 10A.

Figure 10C:
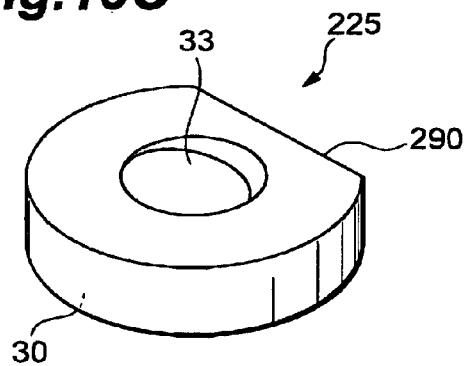
Figure 10D:
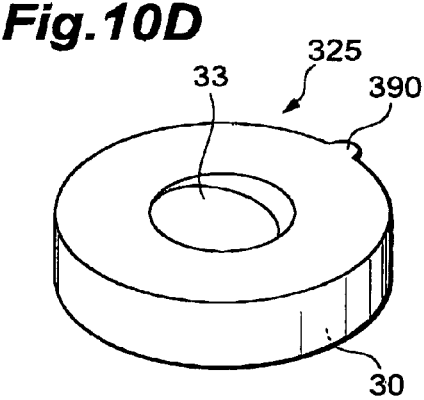
Figure 10E:
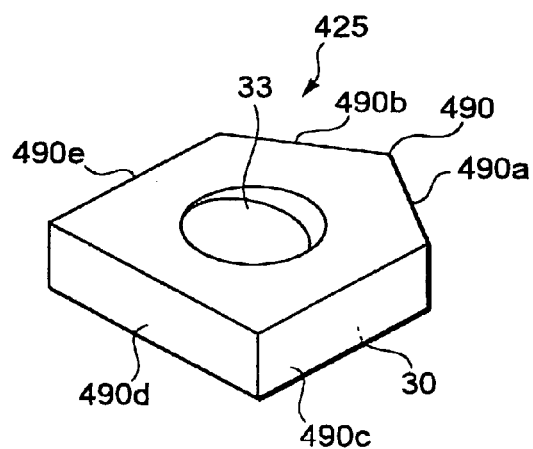

FIGS. 10C to 10E are views showing optical parts 225, 325, 425 provided with tilting direction indication means 290, 390, 490 making the direction of inclination of the light emitting face discernible from the exterior, respectively. Since the optical part is a minute device having a diameter less than 2 mm as mentioned above, such means, provided to indicate the tilting direction that can readily be seen from the exterior, will be useful. The tilting direction indicating means facilitates the orientation of the optical part in attaching and securing it to the sleeve 13.

As shown in FIG. 10C, the tilting direction indicating means may be a plane 290 provided on the side, to which the light emitting face 33 is tilted, of the optical part. The optical part 225 comprises a pair of faces 30 and 33, and the plane 290. Each of the pair of faces 30 and 33 intersects a predetermined axis. The plane 290 is disposed so as to intersect another axis intersecting the predetermined axis. As shown in FIG. 10D, the optical part 325 comprises a protrusion 390 provided on the side face thereof to which the light emitting face 33 is tilted. The optical part 325 comprises a pair of faces 30 and 33, and the protrusion 390. Each of the pair of faces 30 and 33 intersects the predetermined axis. The protrusion 390 is directed in another axial direction intersecting the predetermined axis.

As shown in FIG. 10E, the optical part 425 comprises a corner 490 provided on the side face thereof to which the light emitting face 33 is tilted. The optical part 425 comprises a pair of faces 30 and 33, and the corner 490. Each of the pair of faces 30 and 33 intersects a predetermined axis. The corner part 490 is oriented in another axial direction intersecting the predetermined axis. The corner 490 is defined by the intersection of two side faces 490a and 490b.

The tilting direction indicating means is useful for orienting the optical part to a forming die for molding the sleeve when placing the optical part in the forming die. For example, we will describe that the plane 290 of the optical part 225 and the side faces 490a to 490e of the optical part 425 are quite useful when disposing the optical part in the forming die for molding the sleeve.

Although the present intention is explained according to specific embodiments in the foregoing, the present invention is not limited to the above-mentioned embodiment, and includes all the modifications of the invention falling within the scope of claims thereof, whereas its form, size, arrangement, configuration, and the like can be changed.

The above-mentioned embodiment relates to an optical communication module (transceiver), and it maybe an optical receiving module comprising an optical receiver, a housing containing the optical receiver therein, and a receptacle for accommodating an optical connector for the optical receiver.

The embodiments of the present invention provide an optical part, a receiving module sleeve, a receiving module, and an optical communication module, and these are configured inexpensively.

In the optical part in accordance with this embodiment, since the light emitting face is tilted with respect to a plane perpendicular to the optical axial direction in which light emitted from the end of the optical fiber advances, the reflected return light occurring at the the light emitting face does not go back to the optical fiber. As a consequence, the receiving module sleeve and receiving module incorporating the optical part are become excellent in the transmission quality without degraded operation of the optical transmitter, disposed at the other end of the optical transmission line, caused by the reflected return light reaching the optical transmitter.

Since the optical part is constituted by a single light-transmitting material, it can abut against the optical fiber end to cover the whole of the optical fiber end. This abutting realizes the reduction of reflected return light as well as the excellent transmission quality in a receiving module sleeve, a receiving module, and an optical communication module.

Also, since the optical part is constituted by a single light transmitting material, its configuration is simple, and the optical part has its shorter length taken along the optical axis. This provides a receiving module sleeve, a receiving module, and an optical communication module inexpensively with a small size.

Second Embodiment

Figure 11A:
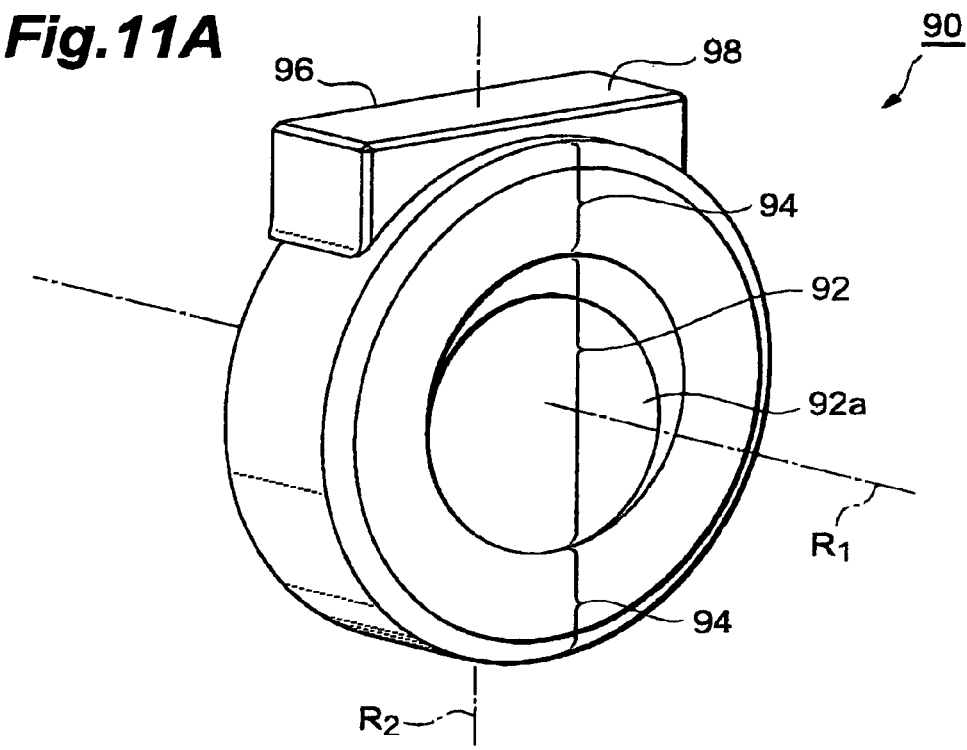
FIGS. 11A and 11B are perspective views each showing the optical part in accordance with another embodiment.
Figure 11B:
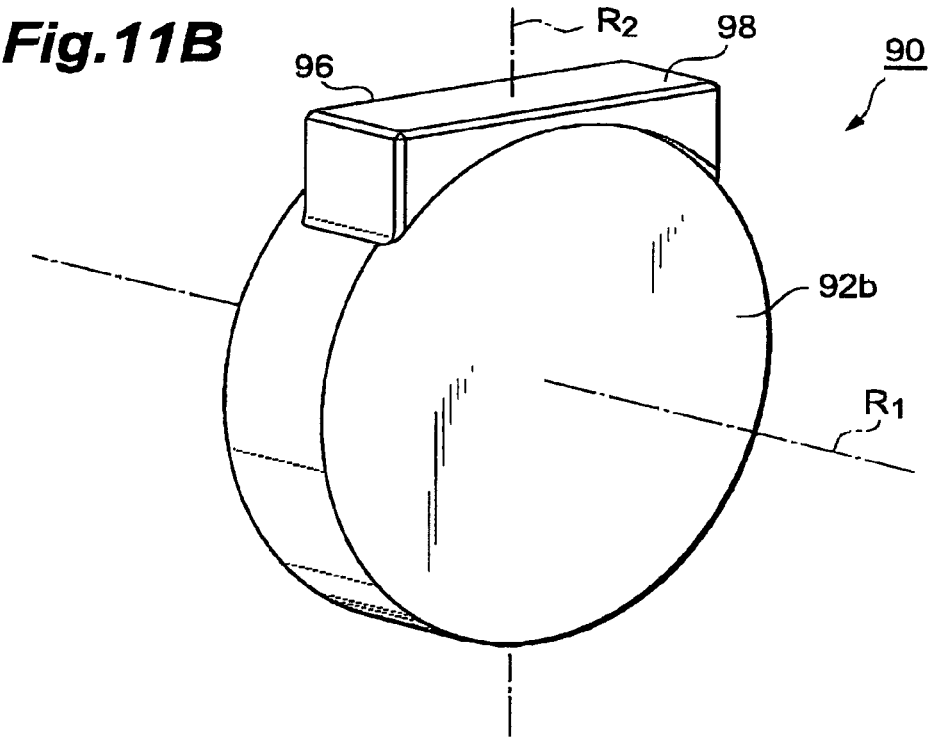
Figure 12A:
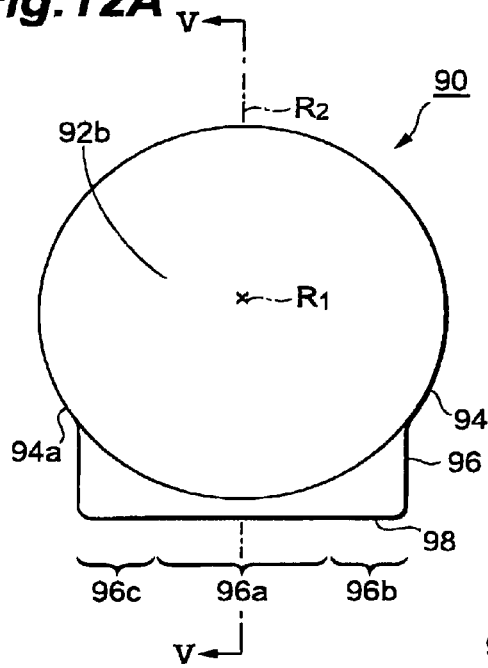
FIG. 12A is a plan view showing one face of the optical part.
Figure 12B:
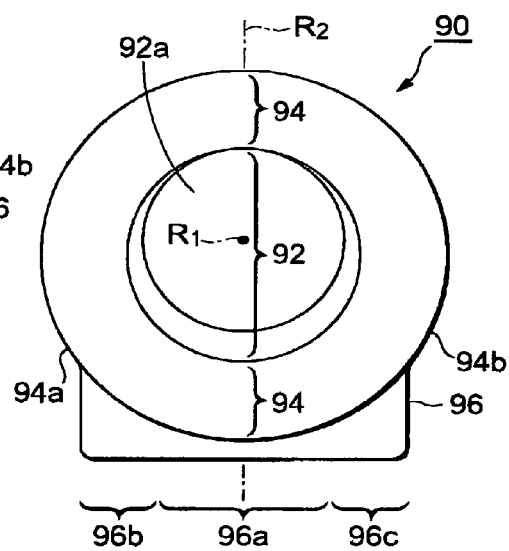
FIG. 12B is a plan view showing the other face of the optical part 90.
Figure 12C:
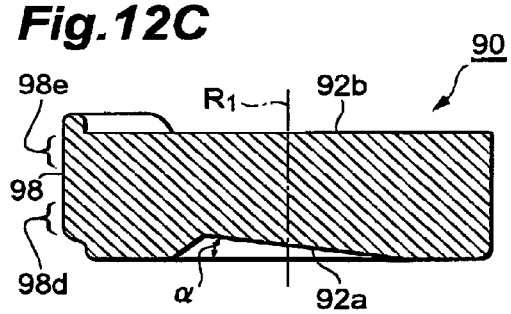
FIG. 12C is a sectional view taken along the line V—V shown in FIG. 12A.
Figure 12D:
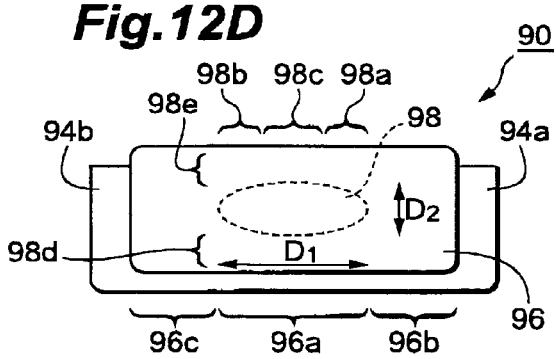
FIG. 12D is a side view showing the front of a reference surface.

FIGS. 11A and 11B are perspective views showing the optical part in accordance with another embodiment. FIG. 11A shows one face of the optical part 90, whereas FIG. 11B shows the other face of the optical part 90. FIG. 12A shows a face 92b of the optical part 90. FIG. 12B shows a face 92a of the optical part 90. FIG. 12C is a sectional view taken along the line V—V shown in FIG. 12A FIG. 12D is a side view showing the front face of a reference surface.

The optical part 90 will be explained in further details with reference to FIGS. 11A, 11B, and 12A to 12D. The optical part 90 is incorporated in a sleeve. In an optical module, this sleeve is used for optically coupling an optical device, such as a semiconductor light-receiving element or semiconductor light-emitting device (reference numeral 9c in FIG. 2B or reference numeral 15c in FIG. 3B), to an optical fiber. The optical part 90 comprises a light-transmitting portion 92 and a supporting portion 94. The optical part 90 is integrally constituted by a material transparent to light associated with the optical device.

The light-transmitting portion 92 has a pair of faces 92a, 92b intersecting a predetermined axis $R_1$, and is transparent to light propagating through an optical fiber. In the optical part 90, one face 92b is provided so as to abut against an end of the optical fiber. The end of the optical fiber abuts against one face 92b of the light-transmitting portion 92 of the optical part 90 and the optical fiber is positioned to the optical part 90. As shown in FIG. 12C, the other face 92a in the optical part 90 is tilted with respect to a plane orthogonal to the predetermined axis $R_1$. Light from the optical fiber is incident on the optical part 90 and then is reflected by the other face 92a of the light-transmitting portion 92. This reflected light does not enter the optical fiber because of the inclination of the other face 92a. The angle of inclination α of the other face 92a may be at least five degrees but not greater than eight degrees. If the angle of inclination is less than five degrees, the reflected light 62 of light 60 in FIGS. 8A and 8B may be return light to the optical fiber. If the angle of inclination exceeds eight degrees, the reflected light 62 of light 60 in FIGS. 8A and 8B may not be return light to the optical fiber, but the amount of deviation of the outgoing light 61 will increase in a direction perpendicular to the longitudinal direction of the optical fiber 50 (optical fiber center axis direction) in FIG. 9. Consequently, the size of the receiving module will become greater in the direction perpendicular to the optical fiber center axis.

The supporting portion 94 is provided adjacent to the light-transmitting portion 92 so as to surround the light-transmitting portion 92. The supporting portion 94 is held with the sleeve body, whereby the light-transmitting portion 92 can be positioned with respect to the sleeve body.

The optical part 90 has a structure capable of reducing its size because this structure is different from that of a short-ferrule comprising an optical fiber therein.

In the optical part 90, one face 92b may comprise a curved surface projecting from a plane orthogonal to the predetermined axis $R_1$. This curved face enables the end of the optical fiber to come into physical contact with the optical part in a reliable fashion. That is, the optical part may be attached to the sleeve body in a position displaced from an appropriate position on a plane perpendicular to the direction in which the optical fiber extends. When one face 92b includes a convex surface, a part of the convex surface can come into contact with the end of the optical fiber. Without no convex surface, one face 92b forms a gap between the end of the optical fiber and one face 92b. This gap generates light reflected by the end of the optical fiber and the face 92b of the optical part 90.

The optical part 90 may further comprise antireflection films (films 27a and 27b in FIG. 6A) provided on at least one of faces 92a and 92b as shown in FIG. 6A. The antireflection film on the face 92b is useful for reducing the quantity of light reflected toward the optical fiber by the face 92b of the optical part 90. The antireflection film on the face 92a is useful for reducing the quantity of light reflected toward the optical device by the face 92a of the optical part 90.

The optical part 90 is integrally formed from a single material. Preferably, this material has a refractive index n of at least 1.36 but not greater than 1.56. The refractive index within this range is close to the refractive index of the optical fiber.

The material for the optical part 90 may be optical glass. The optical part 90 may further comprise a moisture-resistant coating film provided on the face 92b. This coating film can prevent the optical part from being degenerated by humidity. The moisture-resistant coating film may include one of a silicon oxide film and a titanium oxide film.

The material for the optical part 90 may be a molding resin. The optical part 90 may further comprise a reinforcement film (films 28a and 28b in FIG. 6B) provided on the surface 92b. The reinforcement film on the face 92b can enhance the hardness of the surface of the optical part 90. The optical part 90 may further comprise a moisture-resistant protective film (films 29a and 29b in FIG. 6C) disposed on the surface 92b. This moisture-resistant protective film can prevent the optical part 90 from being degenerated by humidity.

The optical part 90 may further comprise a protrusion 96. The protrusion 96 is raised in the direction of another axis $R_2$ intersecting the predetermined axis $R_1$. The protrusion 96 also comprises a reference surface 98 provided along a predetermined plane extending in the direction of the axis $R_1$. Since the protrusion 96 projects in the direction of the other axis $R_2$ the reference surface 98 is useful for positioning the optical part 90 with respect to the sleeve about the predetermined axis $R_1$ when a sleeve containing the optical part 90 is formed. In the optical part 90, the protrusion 96 is useful as indication means for indicating the tilting direction of the face 92a. The indication means in the optical part 90 is not limited to the protrusion 96.

The reference face 98 of the optical part 90 may be provided at the supporting portion 94 as shown in FIG. 10C. For attaining this configuration of the optical part 90, the supporting portion 94 is formed as a cutaway face cut along a predetermined plane extending along the direction of axis $R_1$. The cutaway face functions as the reference surface 98. The reference face 98 of the supporting portion 94 differs from a pair of faces 92a and 92b of the light-transmitting portion 92 and extends along the above-mentioned predetermined plane, thus being useful in forming the sleeve in order to position the optical part 90 with respect to a sleeve containing the optical part 90.

The protrusion 96 will be explained in further details with reference to FIGS. 12A to 12D. The protrusion 96 has a first portion 96a and a second portion 96b, each extending in the direction of another axis $R_2$ intersecting the predetermined axis $R_1$. The first portion 96a is located adjacent to the second portion 96b. The protrusion 96 comprises the reference surface 98, provided in the first portion 96a, extending along the predetermined plane.

In order to mold the optical part 90, a predetermined amount of a material is needed to form the light-transmitting portion 92, the supporting portion 94, and the reference surface 98. However, it is not easy to precisely measure the amount of material for each molding of the optical part. If the optical part is molded with a material exceeding the predetermined amount, there will be a surplus of material. The surplus material may cause the deviation of the dimensions of the optical part from its desired size. The dimensional inaccuracy in the optical part causes inaccuracy in positioning the optical part with respect to the sleeve. If the dimension of the optical part is inaccurate, the axis of the optical part is displaced from the axis of the sleeve.

When the second portion 96b is provided, the surplus material flows into the second portion. The second portion 96b has its volume greater than that corresponding to the surplus of material. Hence, the optical part 90 has the light-transmitting portion 92, supporting portion 94, and reference surface 98 formed with a desirable dimension.

The protrusion 96 further comprises a third part 96c raised from the supporting portion 94 in the direction of axis $R_2$. The minimum distance between the reference surface and supporting portion 94 in the second portion 96b is greater than the maximum value of distance between the reference face and supporting portion 94 in the first portion 96a. The minimum distance between the reference surface and supporting portion 94 in the third portion 96c is greater than the maximum distance between the reference face and supporting portion 94 in the first portion 96a. Hence, upon molding, the first portion 96a is filled with the material earlier than the second portion 96b and the third portion 96c.

The total volume of the second portion 96b and third portion 96c is greater than that corresponding to the surplus material. The first portion 96a is disposed adjacent to the second portion 96 band the third portion 96c. After the first portion 96a is filled with material the surplus material flows into the second and third portions 96b and 96c. The second portion 96b and/or third portion 96c may be formed into various shapes depending on the amount of the surplus material, thus yielding a volume adjustment portion that provides the optical part with reservoir for the surplus material. The volume adjustment portion enables the formation of the optical part 90 composed of the light transmitting portion 92, supporting portion 94, and reference surface 98, each having its desirable dimensions. Therefore, the optical part 90 comprising the second portion 96b and/or third portion 96c obtains a structure allowing a higher positional accuracy of the optical part 90 with respect to the sleeve.

In the optical part 90, the supporting portion 94 has curved side faces 94a, 94b disposed adjacent to the second portion 96b and third portion 96c. According to the protrusion 96 of this structure, the material flowing from the supporting portion 94 goes to the second and third portions 96b and 96c of the protrusion along the side faces 94a and 94b of the supporting portion 94. As a consequence, the desired dimensional accuracy of the sleeve is provided with the supporting portion 94.

Referring to FIG. 12D, the reference surface 98 has a first area 98a adjacent to the second portion 96b, a second area 98b adjacent to the third portion 96c, and a third area 98c positioned between the first area 98a and the second area 98b. The first to third areas 98a, 98b, 98c are arranged from one end to the other end of the protrusion 96. The minimum distance between the third area 98c and the supporting portion 94 is smaller than the maximum distance between the first area 98a and the supporting portion 94. The minimum distance between the third area 98c and the supporting portion 94 is smaller than the maximum distance between the second area 98b and the supporting portion 94. According to the protrusion 96 of this structure, the material from the supporting portion 94 reaches the third area 98c earlier than the first and second areas 98a and 98b. Then, the surplus material flows from the first part 96a of the protrusion 96 to the second and third parts 96b and 96c. Therefore, the reference surface of the first portion 96a can be formed with desired dimensional accuracy.

Referring to FIG. 12C again, the reference surface 98 further comprises a fourth area 98d and a fifth area 98e. The first to third areas 98a to 98c are positioned between the fourth area 98d and the fifth area 98e, and are disposed adjacent to the fourth area 98d and the fifth area 98e. The material from the supporting portion 94 reaches the third area 98c earlier than the fourth and fifth areas 98d and 98e on the reference surface 98d. Therefore, the reference surface of the first portion 96a can be formed reliably.

According to experiments conducted by the inventors, exemplary dimensions of the reference surface are $D_1$=0.6 mm, and $D_2$=0.3 mm in terms of the dimensions of $D_1$ and $D_2$ shown in FIG. 12D. A surface not smaller than those mentioned above can act as a reference surface. The optical part 90 designed by the inventors has such dimensions that the maximum value of the supporting portion (the diameter of a circle in the embodiment) is about 1.7 mm, whereas $D_{MAX1}$=about 1.4 mm and $D_{MAX2}$=about 0.6 mm in the reference surface provided by the first to third portions 96a to 96c of the protrusion 96 in total. The amount of material for the optical part is preferably supplied such that the ratio of $D_1/D_{MAX1}$=0.6 mm/1.4 mm and the ratio of $D_2/D_{MAX2}$=0.3 mm/0.6 mm are satisfied. The dimensions of the second and third portions of the protrusion 96 are defined by the remaining portion of the first part.

Figure 13:
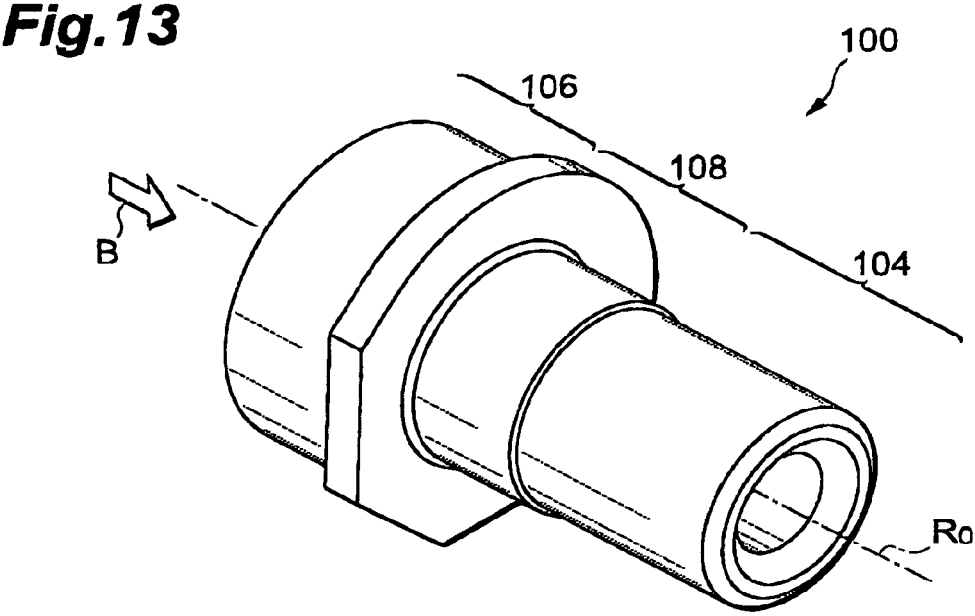
FIG. 13 is a perspective view showing a sleeve containing an optical part.
Figure 14:
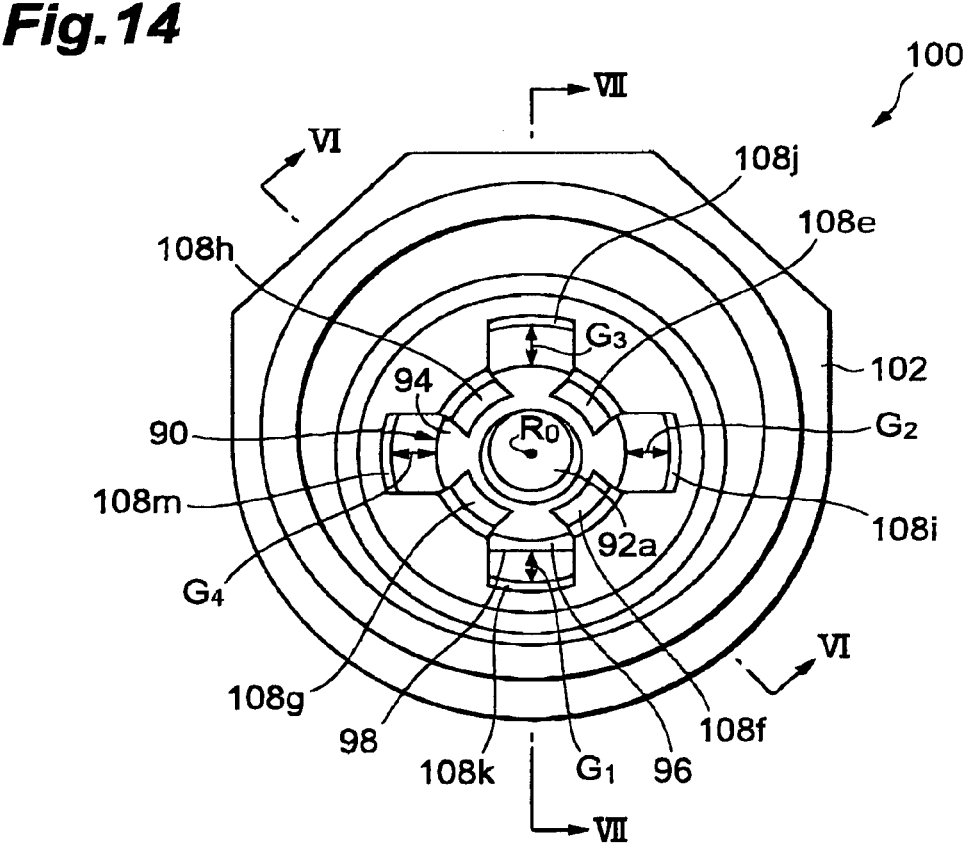
FIG. 14 is a view seen from the direction of arrow B in FIG. 13.
Figure 15A:
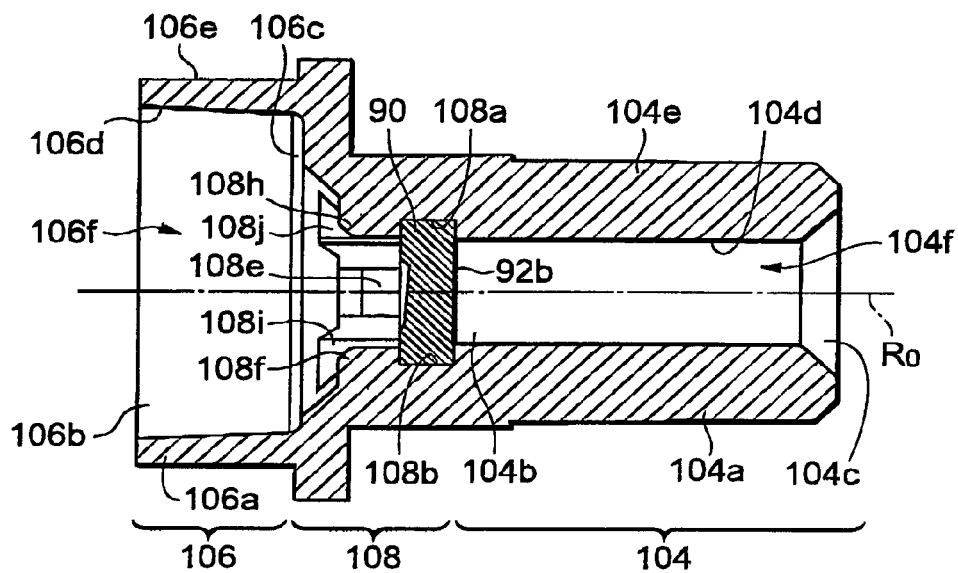
Figure 15B:
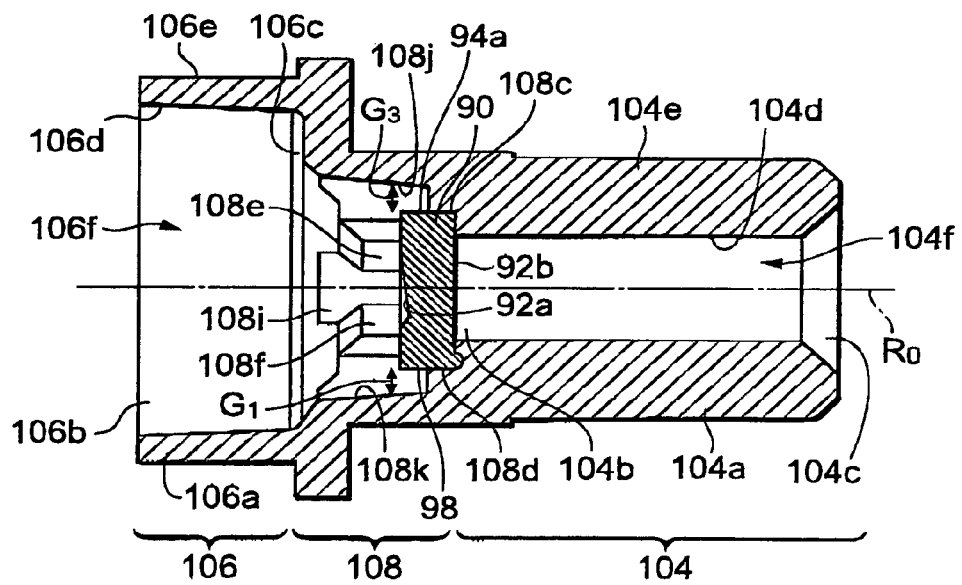
FIG. 15B is a sectional view taken along the line VII—VII of FIG. 14.

FIG. 13 is a perspective view showing a sleeve containing the optical part. This sleeve 100 is utilized for an optical module for optically coupling an optical device to an optical fiber. FIG. 14 is a view observed from the direction of Arrow B in FIG. 13. FIG. 15A is a sectional view taken along the line VI—VI of FIG. 14. FIG. 15B is a sectional view taken along the line VII—VII of FIG. 14.

Referring to FIGS. 13, 15A, and 15B, the sleeve 100 will be described. The sleeve 100 comprises a sleeve body 102 and the optical part 90. The sleeve 100 comprises first to third portions 104, 106, 108 which are arranged along a predetermined axis $R_0$. The first portion 104 is provided so as to receive a ferrule for holding an optical fiber therein. The second portion 106 is provided so as to receive an optical subassembly including an optical device. The third portion 108 is disposed between the first portion 104 and the second portion 106, and holds the optical part 90. This structure can reduce the length of the sleeve.

Referring to FIGS. 15A and 15B, the first portion 104 and second portion 106 of the sleeve 100 will be described, The first portion 104 of the sleeve 100 has a tubular portion 104a extending along the predetermined axis $R_0$, whereas each of one end and the other end of the tubular portion 104a is provided with an opening. The first portion 104 has an inner side face 104d extending in a direction of the predetermined axis $R_0$ to determine the guiding direction in which the ferrule is received, and an outer side face 104e extending in a direction of the predetermined axis $R_0$. Also, the inner side face 104d provides a region 104f for receiving the ferrule.

The second portion 106 of the sleeve 100 has a tubular portion 106a extending in a direction of the predetermined axis $R_0$, whereas each of one end 106a and the other end 106c of the tubular portion 106a is provided with an opening. The second portion 106 has an inner side face 106d extending in a direction the predetermined axis $R_0$ to determine the guiding direction in which the optical subassembly is received, and an outer side face 106e extending in a direction of the predetermined axis $R_0$. Also, the inner side face 106d provides a region 106f for receiving the subassembly.

Referring to FIGS. 14, 15A, and 15B, the third portion 108 of the sleeve 100 will be described. The third portion 108 holds the supporting portion 94 of the optical part 90 such that the axis $R_1$ of the optical part 90 is aligned with the axis $R_0$ of the sleeve 100. The optical part 90 separates the region 104f for receiving the ferrule from the region 106f for receiving the subassembly. The face 92b of the optical part 90 faces one end of the optical fiber held with the ferrule accommodated in the region 104f.

The third part 108 has a recess, referred to with 108a and 108b, holding the supporting portion 94 of the optical part 90. The recess 108a and 108b has a face opposing the side faces 94a and 94b of the supporting portion 94 of the optical part 90 and holds the supporting portion 94 therein. The third portion 108 has a step, referred to with 108c and 108d, for receiving the supporting portion 94 of the optical part 90. The step 108c and 108d is faced to the face 92b of the optical part 90, and the reference surface 98 and side faces 94a, 94b of the supporting member 94.

Referring to FIG. 14, the third portion 108 has a plurality of supporting protrusions 108e, 108f, 108g, 108h (four supporting protrusions in the example shown in FIG. 14). The third portion 108 has a plurality of inner side faces 108i, 108j, 108k, 108m (four faces in the example shown in FIG. 14) positioned between the supporting protrusions 108e, 108f, 108g, and 108h. As shown in FIGS. 15A and 15B, a gap $G_1$ is provided between the inner side face 108k and the reference surface 98 of the optical part 90. A gap $G_2$ is provided between the inner side face 108i and the side face 94b of the optical part 90. A gap $G_3$ is provided between the inner side face 108j and the side faces 94a, 94b of the optical part 90. A gap $G_4$ is provided between the inner side face 108m and the side face 94a of the optical part 90.

The gap $G_1$ has been formed as a result of positioning the reference surface 98 of the optical part 90 with respect to a forming die for molding the sleeve 100. This positioning prevents the optical part 90 from rotating in the forming die. The gaps $G_2$ to $G_4$ has been formed as a result of positioning the side faces 94a, 94b of the supporting portion 94 of the optical part 90 with respect to the forming die for molding the sleeve 100. This positioning determines the position of the optical part 90 in the forming die (the position in two directions in a plane orthogonal to the axis $R_0$).

If the number of gaps is 3 or greater, the optical part 90 can be positioned (by way of the forming die) with respect to the sleeve body 102 in two directions on a plane orthogonal to the axis $R_0$. If the number of gaps is four, the optical part 90 can be positioned (by way of the forming die) with respect to the sleeve body 102 in the two directions, and rotational positions about the axis $R_0$ can be adjusted (by way of the forming die).

The sleeve 100 can be utilized in an optical receiving module such as the one explained in the foregoing embodiments. The receiving module comprises the sleeve 100 and an optical subassembly (15 in FIG. 3B). The optical subassembly is attached to the second portion 106 of the sleeve 100 so as to be optically coupled with the optical part 90. The optical subassembly comprises an optical device, such as a semiconductor light-receiving element, and an optical lens provided such that the optical device is optically coupled with the optical part. In this receiving module, the optical part 90 is useful for reducing the reflection of light from the optical fiber. Since the optical part 90 has already been contained in the sleeve 100, the optical part 90 is not required to be positioned with respect to the sleeve 100. The receiving module can prevent light from being reflected at the optical fiber and from returning to the optical fiber because the optical lens is positioned therein such that its optical axis is displaced from a predetermined axis.

In the forming die, the molding resin flows toward the optical part along the four supporting protrusions 108e, 108f, 108g and 108h. In the sleeve 100, as shown in FIG. 14, the supporting protrusions 108e, 108f, 108g and 108h are arranged with a favorable symmetry with respect to the center axis $R_0$, such that each of the supporting protrusions 108e, 108f, 108g and 108h is opposed to one of the remaining. Therefore, molding resin flows toward the optical part in the supporting protrusions each of which is arranged in opposite to one of others, thereby substantially canceling the pressures, received from the resin flows, on the optical part. This caused no substantial deviation in the position of the optical part during the molding.

Third Embodiment

Figure 16A:
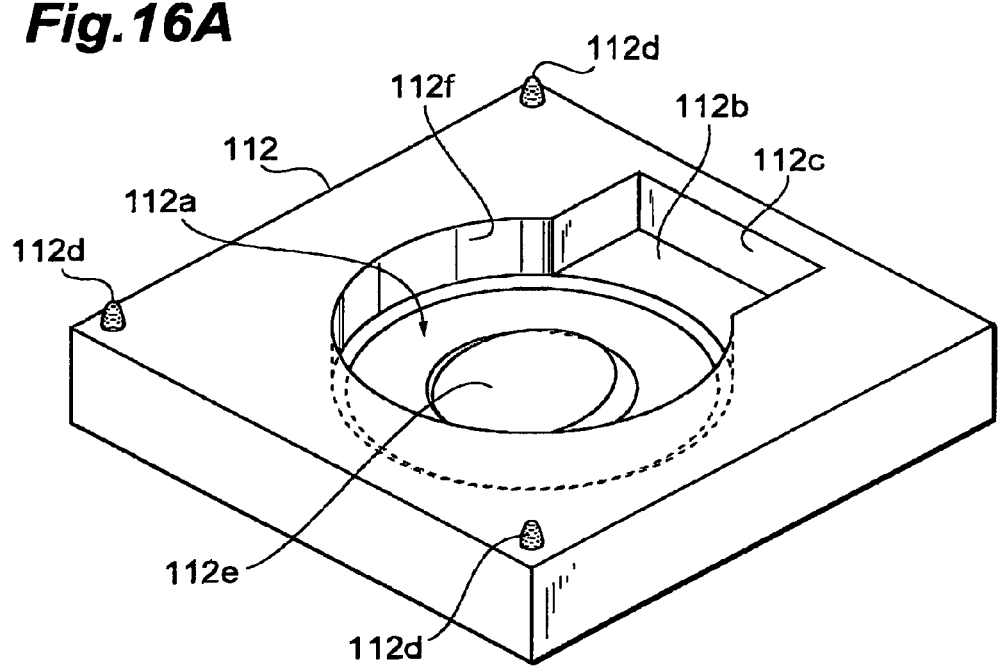
FIGS. 16A and 16B are views, each showing a forming die for molding an optical part.
Figure 16B:
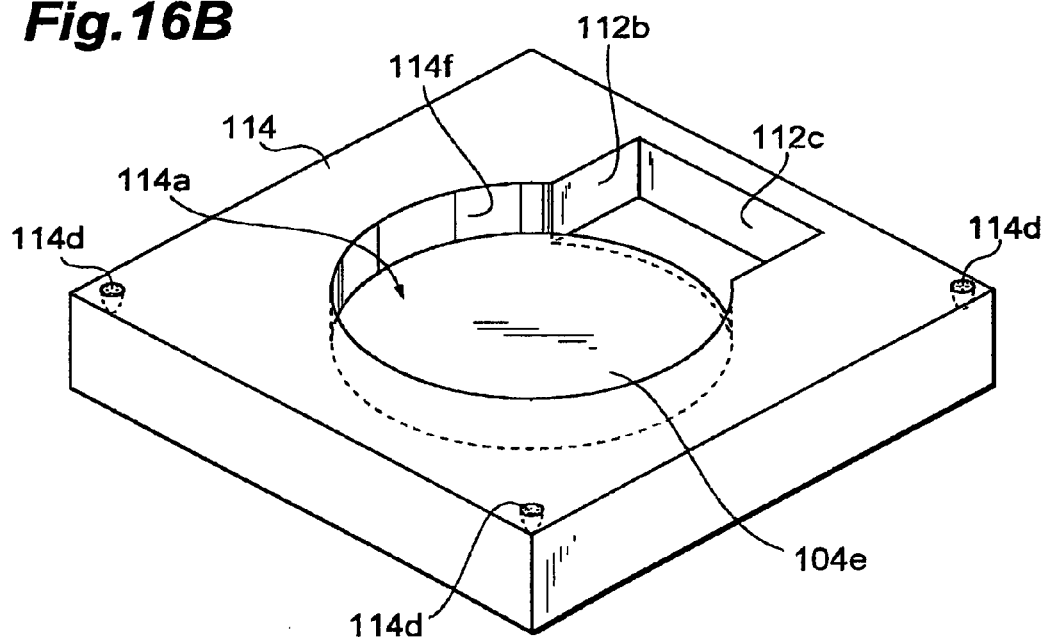

FIGS. 16A and 16B are views showing forming dies for molding an optical part FIG. 16A shows one die 112 of a pair of forming dies for molding the optical part, whereas FIG. 16B shows the other die 114. The forming die 112 comprises a cavity 112a for forming the light-transmitting portion 92 and supporting portion 94 of the optical part 90, a cavity 112b for forming the protrusion 9, a face 112c for forming the reference surface 98, and positioning parts 112d for positioning the forming dies 112 and 114 to each other. The cavity 112a comprises a projection 112e for forming one face 92a of the light-transmitting portion 92, and a side face 112f for forming the side faces 94a and 94b of the supporting portion 94. The forming die 114 comprises a cavity 114a for forming the light-transmitting portion 92 and supporting portion 94 of the optical part 90, a cavity 114b for forming the protrusion 96, a face 114c for forming the reference surface 98, and positioning parts 114d for positioning the forming dies 112 and 114 to each other. The cavity 114a comprises a face 114e for forming the other face 92b of the light-transmitting portion 92, and a side face 114f for forming the side faces 94a and 94b of the supporting portion 94.

Both cavities of the forming dies 112 and 114 have a substantially cylindrical shape corresponding to the light-transmitting portion 92 and supporting portion 94 of the optical, part 90, and a projection corresponding to the protrusion 96 and reference surface 98 of the optical part 90. The projection protrudes from the cylindrical portion. This form of the cylindrical cavity makes it easier to manufacture the forming dies 112 and 14, as explained above, and thus the forming dies for the optical part attain an excellent dimensional accuracy.

Referring to FIGS. 17A to 17D and 18A to 18D, steps of making an optical part will be described FIGS. 17A to 17D are perspective views showing the manufacturing steps. FIGS. 18A to 18D are views showing the manufacturing steps. Steps of making the optical part from a glass material will now be described by way of example.

Step 1

Figure 17A:
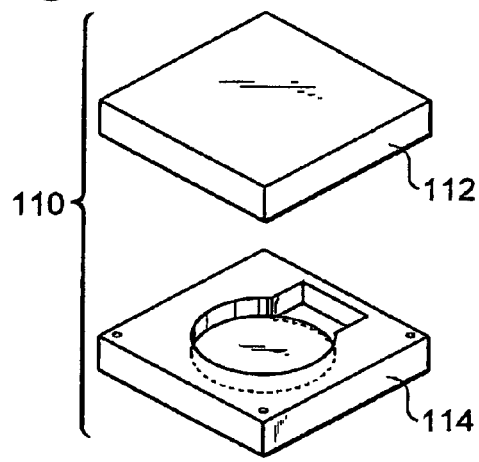
FIGS. 17A to 17D are perspective views showing steps of manufacturing an optical part.
Figure 18A:
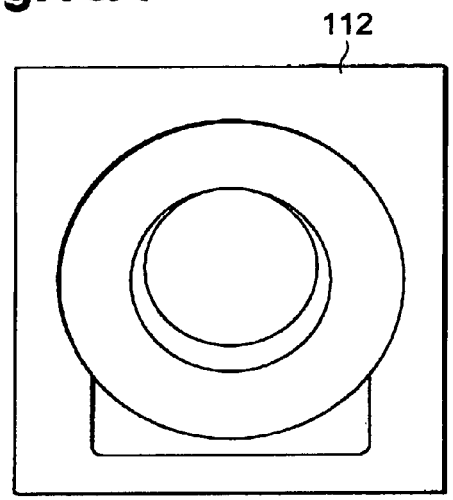
FIGS. 18A to 18D are views showing steps of manufacturing an optical part.

As shown in FIG. 17A, a forming mold 110 is prepared. The forming mold 110 includes forming dies 112 and 114. FIG. 18A is a top plan view showing the forming die 112.

Step 2

Figure 17B:
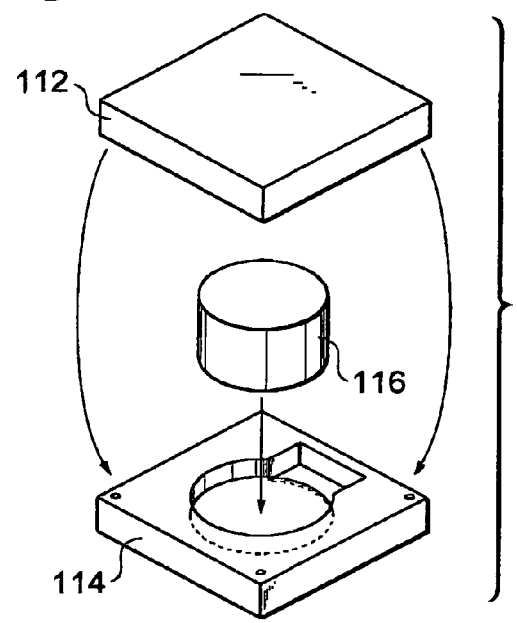
Figure 18B:
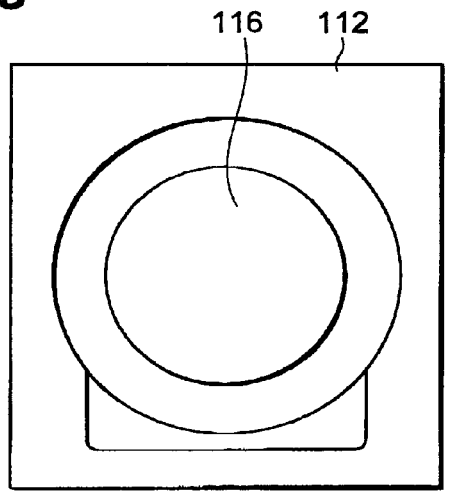

As shown in FIG. 17B, a material tablet 116 is prepared. The material tablet 116 is a glass mass. This glass is heated to a predetermined temperature or higher. Subsequently, the material tablet 116 is provided between the forming dies 112 and 114. FIG. 18B shows the material tablet 116 provided on the forming die 112. The height of the material tablet 116 is greater than that of the optical part. The material tablet 116 has a volume smaller than the total volume of the cavities in the forming dies 112 and 114. A volume of the material tablet 116 falls within a range greater than a predetermined proportion of the total volume of the cavities in the forming dies 112 and 114. The material tablet 116 of a volume in this range ensures to form the reference surface 98 of the protrusion 96 of the optical part 90, and forms the light-transmitting portion 92 and supporting portion 94 excellent in dimensional accuracy.

Step 3

Figure 17C:
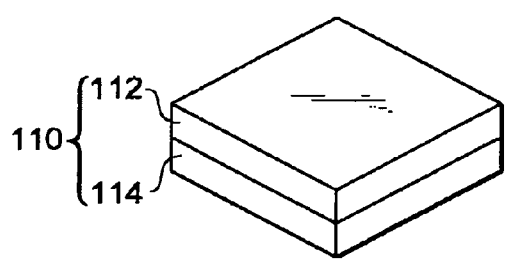
Figure 18C:
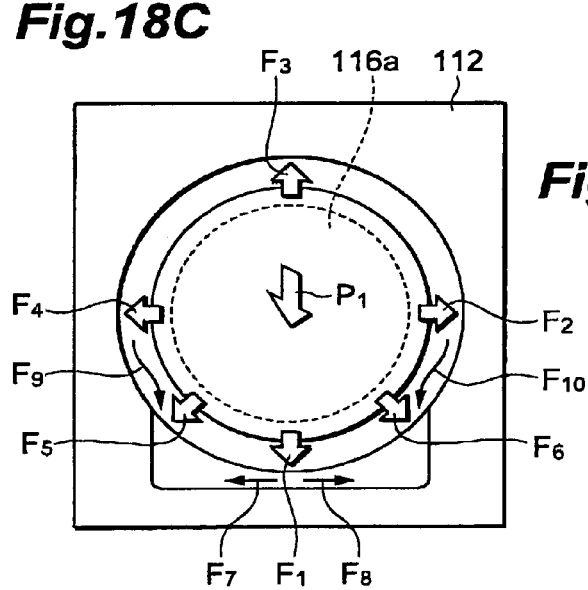
Figure 18D:
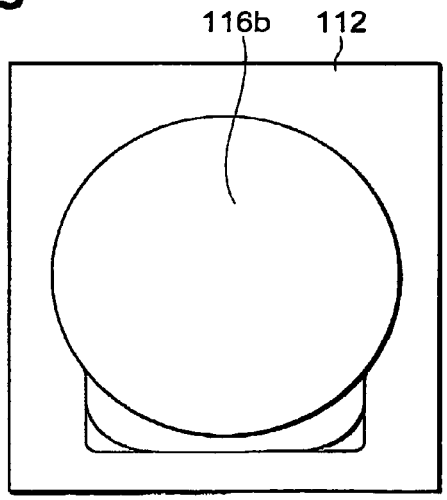

As shown in FIG. 17C, the forming dies 112 and 114 are assembled together in order to process the material tablet into a desirable form. The forming dies 112 and 114 are heated to a predetermined temperature or higher. The material tablet 116 between the forming dies 112 and 114 deforms in conformity to the shape of the cavity provided by the forming dies 112 and 114. Referring to FIG. 18C, this deformation will be described. The height of the material tablet 116 is greater than that of the optical part. As a result, the material tablet 116 collapses upon receiving a force $P_1$ from the forming dies 112 and 114 when the forming dies 112 and 114 are assembled together. The glass material of the material tablet 116 flows out in all directions as flows $F_1$ to $F_6$. In the protrusion of the optical part, the reference surface of the first portion of the optical part is formed by the flow $F_1$. The part of the flows $F_5$ and $F_6$ form the second and third portions of the optical part. Subsequently, the parts of material flows $F_7$ and $F_8$ spilled out of the first portion flow into the second and third portions of the optical part. Also, the parts of material flows $F_9$ and $F_{10}$ are spilled out of the light-transmitting portion and supporting portion of the optical part, and the spilled out amount flows into the second and third portions of the protrusion. FIG. 18D shows a substantially solidified glass 116b and the forming die 112 after the material has completely moved.

Step 4

Figure 17D:
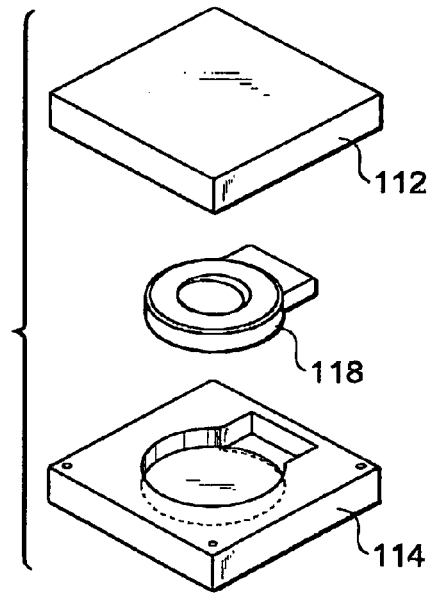

As shown in FIG. 17D, the forming mold 110 is divided into the forming dies 112 and 114 to take out the accomplished optical part 118 therefrom.

Figure 19A:
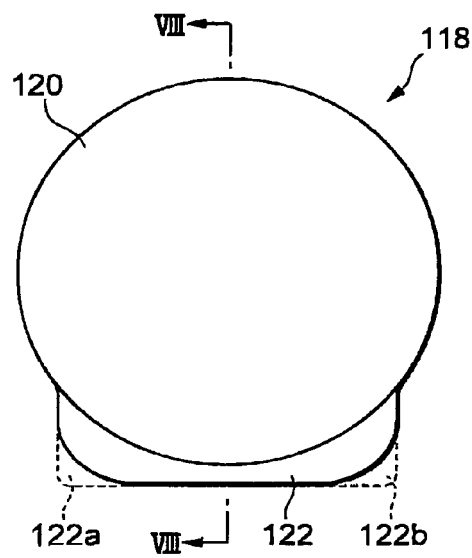
FIG. 19A shows one face of an optical part.
Figure 19B:
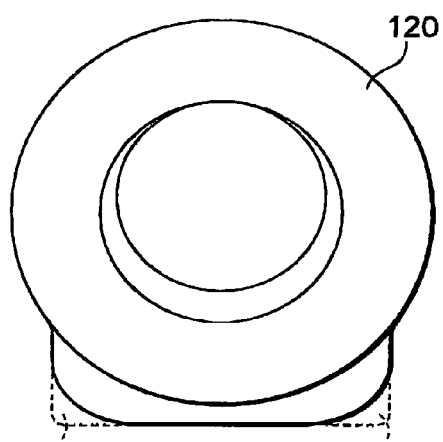
FIG. 19B shows another face of the optical part.
Figure 19C:
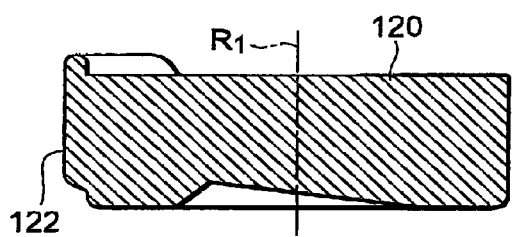
FIG. 19C shows a cross section taken along the line VIII—VIII shown in FIG. 19A.
Figure 19D:
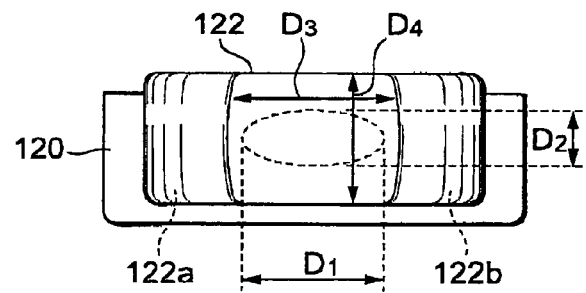
FIG. 19D is a view showing the front of a reference surface.

FIG. 19A is a view showing one face of thus accomplished optical part. FIG. 19B is view showing the other face of the accomplished optical part. FIG. 19C is a cross section taken along the line VIII—VIII shown in FIG. 19A. FIG. 19D is a side view showing the front face of the reference surface.

The optical part 118 comprises a light-transmitting and supporting portion 120, and a protrusion 122. The light-transmitting and supporting portion 120 is formed with a favorable dimensional accuracy which is substantially the same as that of the light-transmitting portion 92 and supporting portion 94 of the optical part 90. As shown in FIGS. 19A, 19B, and 19D, the protrusion 122 is formed with chipped portions 122a and 122b. The chipped portions 122a and 122b are in the second and third portions of the protrusion but not in the first portion thereof. As shown in FIG. 19C, the protrusion 122 is formed with the reference surface 98. As shown in FIG. 19D, the reference surface 98 has typical dimensions $D_3$ and $D_4$. The value $D_3$ is greater than the value $D_1$, whereas the value $D_4$ is greater than the value $D_2$.

From the foregoing description, the following will be seen. Although a predetermined amount of material is needed to reliably form a light-transmitting portion, a supporting portion, and a reference surface in molding an optical part, precisely measuring the amount of material for each molding of the optical part is not easy. If the optical part is molded by a material exceeding the predetermined amount, a surplus of the material is generated. The surplus material may cause the deviation of the optical part in its dimensions. Since the dimensional inaccuracy of the optical part affects the positional inaccuracy of the optical part with respect to the sleeve, this deviation will decrease the accuracy in axial alignment of the optical part with the sleeve.

When the protrusion of the optical part is provided with the second portion, the surplus material flows into the second portion. The volume of the second portion is greater than that corresponding to the surplus of material. Hence, the optical part comprises a light-transmitting portion, a supporting portion, and a reference surface which are reliably provided in a desirable dimensional accuracy. Consequently, the structure of the optical part allows the higher positioning accuracy of the optical part with respect to the sleeve.

Although the principle of the present invention is illustrated and explained in the preferred embodiments, one skilled in the art will see that the present invention can be modified in its arrangement and details without deviating from principles. Consequently, a right is demanded for all the modifications and changes from the scope of claims and spirits thereof.

What is claimed is:

1. An optical part for a sleeve for an optical module for optically coupling an optical device to an optical fiber, said optical part comprising:

a light-transmitting portion, transparent to light propagating through said optical fiber, having a pair of faces intersecting a predetermined axis extending along a predetermined face, one of said pair of faces being provided so as to abut against an end of said optical fiber, the other of said pair of faces being tilted with respect to a plane orthogonal to said predetermined axis;

a supporting portion provided adjacent to said light-transmitting portion and provided to be held with said sleeve; and a protrusion having a reference surface extending along said predetermined face, said protrusion comprising first to third portions projecting from said supporting portion in a direction of another axis intersecting said predetermined axis, said reference surface being provided with said first portion and having a first area adjacent to said second portion, a second area adjacent to said third portion, and a third area positioned between said first and second areas;

wherein a distance between said first area and said supporting portion is greater than that between said third area and said supporting portion, and a distance between said second area and said supporting portion is greater than that between said third area and said supporting portion; and wherein said optical part is constituted by material transparent to light associated with said optical device.

2. The optical part according to claim 1, wherein said one face of said pair of faces comprises a curved surface provided so as to project.

3. The optical part according to claim 1, wherein said other of said pair of faces is tilted at an angle of at least five degrees but not greater than eight degrees.

4. The optical part according to claim 1, wherein said first portion is held between said second and third portions; and
wherein said supporting portion has a curved side face provided adjacent to said second and third portions.

5. The optical part according to claim 1, further comprising an antireflection film provided on at least one of said pair of faces.

6. The optical part according to claim 1, further comprising a moisture-resistant coating film provided on at least one of said pair of faces.

7. An optical communication module comprising:
a first receptacle for accommodating an end of an receiving optical fiber;
an optical receiving module provided adjacent to said first receptacle, said optical receiving module converting an optical signal provided from said end of said receiving optical fiber into an electric signal, said optical receiving module including:
a sleeve for an optical receiving module including,
a ferrule engaging portion for engaging a ferrule provided at an end of said receiving optical fiber,
an optical part comprising:
a light-transmitting portion, transparent to light propagating through said optical fiber, having a pair of faces intersecting a predetermined axis extending along a predetermined face, one of said pair of faces being provided so as to abut against an end of said optical fiber, the other of said pair of faces being tilted with respect to a plane orthogonal to said predetermined axis; and
a supporting portion provided adjacent to said light-transmitting portion and provided to be held with said sleeve;
a protrusion having a reference surface extending along said predetermined face, said protrusion comprising first to third portions projecting from said supporting portion in a direction of another axis intersecting said predetermined axis, said reference surface being provided with said first portion and having a first area adjacent to said second portion, a second area adjacent to said third portion, and a third area positioned between said first and second areas,
wherein a distance between said first area and said supporting portion is greater than that between said third area and said supporting portion, and a distance between said second area and said supporting portion is greater than that between said third area and said supporting portion;
wherein said optical part is constituted by material transparent to light associated with said optical device; and
wherein said optical part is provided adjacent to said ferrule engaging portion and provided to abut against an end of said receiving optical fiber when said receiving optical fiber is engaged in said ferrule engaging portion, and
a photoelectric transducer attachment provided in one end of said sleeve, said ferrule engaging portion being provided in the opposite of said sleeve, and
a photoelectric transducer, attached to said photoelectric transducer attachment, having an optical lens working on light from said receiving optical fiber;
a second receptacle for accommodating an end of a transmitting optical fiber; and
a transmitting module disposed adjacent to said second receptacle, said transmitting module converting an electric signal into an optical signal and then emitting thus converted optical signal.

8. The optical communication module according to claim 7, wherein said optical lens is placed such that a geometric center of gravity thereof deviates from an extension of the center axis of said optical fiber.

9. An optical communication module comprising:
a housing comprising a first receptacle provided to accommodate an end of a receiving optical fiber for propagating receiving light therethrough, and a second receptacle provided to accommodate an end of a transmitting optical fiber for propagating transmitting light therethrough;
an optical receiving module provided in said housing so as to receive said receiving light, said optical receiving module including:
an optical subassembly having an optical device including a semiconductor light receiving element,
a sleeve for optically coupling said optical device to said receiving optical fiber, said sleeve including:
an optical part comprising:
a light-transmitting portion, transparent to light propagating through said optical fiber, having a pair of faces intersecting a predetermined axis extending along a predetermined face, one of said pair of faces being provided so as to abut against an end of said optical fiber, the other of said pair of faces being tilted with respect to a plane orthogonal to said predetermined axis; and
a supporting portion provided adjacent to said light-transmitting portion and provided to be held with said sleeve;
a protrusion having a reference surface extending along said predetermined face, said protrusion comprising first to third portions projecting from said supporting portion in a direction of another axis intersecting said predetermined axis, said reference surface being provided with said first portion and having a first area adjacent to said second portion, a second area adjacent to said third portion, and a third area positioned between said first and second areas;
wherein a distance between said first area and said supporting portion is greater than that between said third area and said supporting portion, and a distance between said second area and said supporting portion is greater than that between said third area and said supporting portion; and
wherein said optical part is constituted by material transparent to light associated with said optical device;
first to third portions arranged along said predetermined axis, said first portion having an inner side face provided so as to receive therein a ferrule for holding said receiving an optical fiber, said second portion having an inner side face provided to receive said optical subassembly, said third portion being provided between said first and second portions and having at least one inner side face extending in a direction of said predetermined axis, said third portion having a plurality of projections for holding said optical part such that said reference surface of said optical part is separated from said inner side face of the third portion to form one or more gaps between said supporting portion and said inner side face of the third portion and between said plurality of projections, said optical subassembly being attached to said second portion of said sleeve so as to be optically coupled with the other of said pair of surfaces of the optical part; and an optical lens provided so as to couple said optical device to said other of said pair of surfaces of the optical part; and an optical transmitting module provided in said housing so as to provide said transmitting light.

10. The optical communication module according to claim 9, wherein said third portion further comprises a plurality of projections for holding said optical part; and wherein said supporting portion of said optical part is separated from said inner side face of said third portion to form one or more gaps between said supporting portion and said inner side face of said third portion and between said plurality of projections.

11. The optical communication module according to claim 10, wherein the number of gaps is three or more.

12. The optical communication module according to claim 10, wherein the number of gaps is four.

13. The optical communication module according to claim 9, wherein said optical lens is positioned such that an optical axis of said optical lens deviates from said predetermined axis.

* * * * *